US012772981B2

(12) United States Patent
Huckabee et al.

(10) Patent No.: US 12,772,981 B2
(45) Date of Patent: Oct. 27, 2026

(54) WATER-BASED INSECTICIDAL AND INSECT REPELLENT COMPOSITIONS

(71) Applicant: S. C. Johnson & Son, Inc., Racine, WI (US)

(72) Inventors: Alexis Huckabee, Kenosha, WI (US); Amber J. Yeary, Racine, WI (US); Cassidy N. Goff, Wauwatosa, WI (US)

(73) Assignee: S. C. JOHNSON & SON, INC., Racine, WI (US)

(*) Notice: Subject to any disclaimer, the term of this patent is extended or adjusted under 35 U.S.C. 154(b) by 260 days.

(21) Appl. No.: 17/989,560

(22) Filed: Nov. 17, 2022

(65) Prior Publication Data

US 2023/0148611 A1 May 18, 2023

Related U.S. Application Data

(60) Provisional application No. 63/280,986, filed on Nov. 18, 2021, provisional application No. 63/280,982, filed on Nov. 18, 2021.

(51) Int. Cl.

| | |
|---|---|
| ***A01N 65/22*** | (2009.01) |
| ***A01N 25/02*** | (2006.01) |
| ***A01N 25/30*** | (2006.01) |
| ***A01N 31/02*** | (2006.01) |
| ***A01P 17/00*** | (2006.01) |

(52) U.S. Cl.

CPC ............. *A01N 65/22* (2013.01); *A01N 25/02* (2013.01); *A01N 25/30* (2013.01); *A01N 31/02* (2013.01); *A01P 17/00* (2021.08)

(58) Field of Classification Search

None

See application file for complete search history.

(56) References Cited

U.S. PATENT DOCUMENTS 4,968,666 A 11/1990 Sugi
5,352,437 A 10/1994 Nakagawa et al.
6,548,085 B1 * 4/2003 Zobitne .................. A01N 61/02 424/769
6,808,717 B1 10/2004 Bale
6,932,986 B2 * 8/2005 Mishima ................ A01N 65/00 424/747
7,201,926 B2 * 4/2007 Fried ...................... A01N 27/00 424/747
7,988,985 B2 8/2011 Bessette
8,394,358 B2 3/2013 Schneidmiller et al.
8,397,427 B2 3/2013 Schneidmiller et al.
8,501,247 B2 8/2013 Enan et al.
8,591,927 B2 11/2013 Sims
8,691,256 B2 4/2014 Enan
8,815,303 B2 8/2014 Lewis
9,005,644 B2 4/2015 Sims
9,210,926 B2 12/2015 Markus et al.
9,326,524 B1 5/2016 Jack et al.
9,492,490 B1 11/2016 Enan
9,572,348 B2 2/2017 Messina
9,622,947 B2 4/2017 Tamarkin et al.
9,693,566 B2 7/2017 Messina, Sr.
10,149,481 B2 12/2018 Bissinger et al.
10,226,050 B2 3/2019 Nair et al.
10,368,543 B2 8/2019 Enan
10,595,529 B1 3/2020 Enan
10,785,976 B2 9/2020 Vandock et al.
10,785,977 B2 9/2020 Vandock et al.
10,905,114 B2 2/2021 Manhas et al.
11,206,834 B2 12/2021 Suranyi
11,653,654 B1 5/2023 Batton
11,896,007 B2 2/2024 Enan
2001/0055628 A1 12/2001 Hsu et al.
2003/0108582 A1 6/2003 Willis
2004/0131627 A1 7/2004 Werdyger
2004/0253287 A1 12/2004 Denton
2007/0098750 A1 5/2007 Bessette
2007/0178128 A1 8/2007 Bessette
2007/0190094 A1 8/2007 Bessette
2008/0187607 A1 8/2008 Bessette
2008/0269177 A1 * 10/2008 Bessette ................ A01N 65/16 514/163
2008/0274072 A1 11/2008 Manolas et al.
2010/0120724 A1 5/2010 Bessette
2010/0140368 A1 6/2010 de Lame et al.
2010/0196520 A1 8/2010 Elraz (Continued)

FOREIGN PATENT DOCUMENTS

CN 105017875 A 11/2014
CN 106619473 A 5/2017

(Continued)

OTHER PUBLICATIONS

Stansly, P. et al., "Crop and Inset Response to Horticultural Mineral Oil on Tomatot and Pepper", Proc. Fla. State Hort. Soc. 118:132-141, 2005, XP093031938.
Non-Final Office Action in U.S. Appl. No. 17/989,529 dated Feb. 3, 2023.
Final Office Action in U.S. Appl. No. 17/989,529 dated Mar. 24, 2023.
International Search Report and Written Opinion in Application No. PCT/US2022/050377 dated Mar. 29, 2023.
Anonymous, "Ecotec Broad Spectrum Insecticide and Miticide", Jul. 31, 2012, XP093032422, Retrieved from the Internet: https://www.domyown.com/msds/Ecotec-Label.pdf.
Anonymous, "EPA R.E.D. Facts—Soap Salts", United States Office of Environmental Protection Agency, Office of Prevention, Pesticides And Toxic Substances (7508W), EPA-738-F-92-013, Sep. 30, 1992, XP093032860.

(Continued)

*Primary Examiner* — Sahana S Kaup
*Assistant Examiner* — Ashlee E Wertz
(74) *Attorney, Agent, or Firm* — Quarles & Brady LLP

(57) ABSTRACT

A pest control composition, the composition including an active component having between about 0.1 wt. % and about 15 wt. % spearmint oil, between about 0.05 wt. % and about 5 wt. % rosemary oil, and sodium lauryl sulfate. The composition further including a carrier, a solvent, and a surfactant.

20 Claims, No Drawings

(56) References Cited

U.S. PATENT DOCUMENTS

| | | | |
|---|---|---|---|
| 2010/0197786 A1 | 8/2010 | Elraz | |
| 2011/0229589 A1 | 9/2011 | Elraz | |
| 2012/0039973 A1 | 2/2012 | Grlica et al. | |
| 2013/0017281 A1 | 1/2013 | Nouvel | |
| 2013/0034619 A1 | 2/2013 | Nys | |
| 2013/0078296 A1 | 3/2013 | Grlica et al. | |
| 2014/0050809 A1 | 2/2014 | Angone | |
| 2015/0359230 A1* | 12/2015 | Messina ................ | A01N 65/40 424/731 |
| 2015/0373996 A1 | 12/2015 | Williams, II | |
| 2016/0165899 A1 | 6/2016 | Bissinger et al. | |
| 2016/0309725 A1 | 10/2016 | Nair et al. | |
| 2017/0118998 A1 | 5/2017 | Bessette et al. | |
| 2017/0295801 A1 | 10/2017 | Waite | |
| 2018/0168149 A1 | 6/2018 | Jones, Jr. | |
| 2018/0338501 A1 | 11/2018 | Pelah et al. | |
| 2019/0274312 A1 | 9/2019 | Bissinger et al. | |
| 2019/0320653 A1 | 10/2019 | Enan | |
| 2019/0327978 A1 | 10/2019 | Kidd | |
| 2020/0093123 A1 | 3/2020 | Bradbury et al. | |
| 2020/0120724 A1 | 4/2020 | Vaidya et al. | |
| 2020/0154717 A1 | 5/2020 | Anderson | |
| 2020/0222297 A1 | 7/2020 | Park et al. | |
| 2020/0323203 A1 | 10/2020 | Manhas et al. | |
| 2020/0329716 A1 | 10/2020 | Enan | |
| 2020/0390110 A1 | 12/2020 | Lane | |
| 2021/0076686 A1 | 3/2021 | Li et al. | |
| 2021/0145011 A1 | 5/2021 | Li et al. | |
| 2021/0169061 A1 | 6/2021 | Majher | |
| 2021/0186852 A1 | 6/2021 | Dutil | |
| 2022/0053760 A1 | 2/2022 | Enan | |
| 2022/0079166 A1 | 3/2022 | Mitlitski et al. | |
| 2022/0142157 A1 | 5/2022 | Chappuis et al. | |
| 2022/0225601 A1 | 7/2022 | Manhas et al. | |
| 2022/0232826 A1 | 7/2022 | Enan | |
| 2022/0338482 A1 | 10/2022 | Enan | |
| 2022/0361507 A1 | 11/2022 | Jactel et al. | |
| 2023/0042086 A1 | 2/2023 | Mui et al. | |
| 2023/0045266 A1 | 2/2023 | Calderas et al. | |
| 2023/0137223 A1 | 5/2023 | Huber et al. | |
| 2023/0148609 A1 | 5/2023 | Huckabee | |
| 2023/0148610 A1 | 5/2023 | Huckabee | |
| 2023/0189812 A1 | 6/2023 | Best et al. | |
| 2023/0189820 A1 | 6/2023 | Mui et al. | |

FOREIGN PATENT DOCUMENTS

| | | | |
|---|---|---|---|
| EP | 1404352 | B1 | 4/2004 |
| EP | 1071323 | B1 | 7/2004 |
| EP | 1249167 | B1 | 3/2006 |
| EP | 1744632 | A1 | 1/2007 |
| EP | 2494959 | B1 | 9/2012 |
| EP | 1556009 | B1 | 12/2014 |
| EP | 1744632 | B1 | 4/2015 |
| EP | 2422768 | B1 | 4/2015 |
| EP | 1940227 | B1 | 9/2015 |
| EP | 2977043 | A2 | 1/2016 |
| EP | 1699433 | B1 | 5/2017 |
| EP | 3639666 | A1 | 4/2020 |
| EP | 3672409 | A1 | 7/2020 |
| EP | 3672410 | A1 | 7/2020 |
| EP | 3731639 | A1 | 11/2020 |
| EP | 3771335 | A1 | 2/2021 |
| EP | 3731639 | A4 | 8/2021 |
| EP | 3866958 | A1 | 8/2021 |
| EP | 3930461 | A1 | 1/2022 |
| WO | 2004043436 | A1 | 5/2004 |
| WO | 2006020675 | A1 | 2/2006 |
| WO | 2009147648 | A2 | 12/2009 |
| WO | 2011151766 | A2 | 12/2011 |
| WO | 2012050987 | A2 | 4/2012 |
| WO | 2013155438 | A1 | 10/2013 |
| WO | 2018206866 | A1 | 11/2018 |
| WO | 2019195947 | A1 | 10/2019 |
| WO | 2019195948 | A1 | 10/2019 |
| WO | 2020198853 | A1 | 10/2020 |
| WO | 2020261084 | A1 | 12/2020 |
| WO | 2021094959 | A1 | 5/2021 |
| WO | 2021096947 | A1 | 5/2021 |
| WO | 2021198198 | A1 | 10/2021 |
| WO | 2021223032 | A1 | 11/2021 |
| WO | 2022013204 | A1 | 1/2022 |
| WO | 2022119738 | A1 | 6/2022 |
| WO | 2022140639 | A1 | 6/2022 |
| WO | 2022147076 | A1 | 7/2022 |
| WO | 2022189777 | A1 | 9/2022 |

OTHER PUBLICATIONS

Anonymous, "EPA R.E.D. Facts—Wood Oils and Gums (Cedarwood Oil)", United States Office of Environmental Protection Agency, Office of Prevention, Pesticides And Toxic Substances (7508W), EPA-738-F-93-008, Sep. 1993, XP93033492.

Anonymous, "Treating Head Lice Infestations with Resultz, Lice Treatment About Lice and Their Life Cycle", Apr. 30, 2019, XP093031967, Retrieved from the Internet: https://www.miravohealthcare.com/wp-content/uploads/2020/11/Resultz-CM-ENG-April-2019.pdf.

Baker et al., "Cedarwood Oil Profile Cedarwood Oil Profile Active Ingredient Eligible for Minimum Risk Pesticide Use", Dec. 31, 2018, pp. 1-8, XP093033489.

Baker et al., "Mint and Mint Oil Profile Mint and Mint Oil Profile Active Ingredient Eligible for Minimum Risk Pesticide Use", Jan. 20, 2020, XP093032381, Retrieved from the Internet: http://hdl.handle.net/1813/56133.

Bakr et al., "Insecticidal activity of Four Volatile Oils on Two Museum Insects Pests", Egypt. Acad. J. Biology. Sci., 2(2):57-66 (2010), XP093032404.

Written Opinion in Application No. PCT/US2022/050382 dated Mar. 29, 2023.

International Search Report and Written Opinion in Application No. PCT/US2022/050379 dated Mar. 28, 2023.

Isman et al., "Bioinsecticides based on plant essential oils: A short overview", Journal of Biosciences, vol. 75, No. 7-8. Apr. 24, 2020, pp. 179-182, XP055825088.

Isman et al., "Insecticidal Activities of Commercial Rosemary Oils (*Rosmarinus officinalis*) Against Larvae of Pseudaletia unipuncta and Trichoplusia ni in Relation to Their Chemical Compositions", Pharmaceutical Biology, vol. 46, No. 1-2, Jan. 1, 2008, pp. 82-87, XP093032563.

Kowalska et al., "Cinnamon as a Useful Preventive Substance for the Care of Human and Plant Health", Molecules, vol. 26, No. 17, Aug. 31, 2021, p. 5299, XP093033486.

Mohafrash et al., "Mentha spicata essential oil nanoformulation and its larvicidal application against Culex pipiens and Musca domestica", Industrial Crops and Products, vol. 157, Sep. 19, 2020, 112944, XP086319242.

Saraiva, "Insecticidal and repellent activity of geranium essential oil against Musca domestica and Lucilia cuprina", International Journal of Tropical Insect Science, vol. 40, Mar. 24, 2020, pp. 1093-1098, XP09303360.

Yang et al., "Fumigant toxicity and physiological effects of spearmint (*Mentha spicata*, Lamiaceae) essential oil and its major constituents against Reticulitermes dabieshanensis", Industrial Crops and Products, vol. 171, Aug. 12, 2021, 113894, XP086773728.

Beltagy et al., Quality control, chemical composition and antioxidant activity of some marketed peppermint oil samples, International Journal of Pharmaceutical Sciences and Research, 2019, 10(8):3865-3872.

Cassiday, Emulsions: Making Oil and Water Mix, American Oil Chemists' Society (AOCS), Retrieved from https://www.aocs.org/resource/emulsions-making-oil-and-water-mix/, Apr. 2014, 9 pages.

Qin et al., Laboratory and field evaluation of the repellency of six preservatives to red imported fire ants (Hymenoptera: Formicidae), Journal of Asia-Pacific Entomology, 2017, 20(2):535-540.

(56) References Cited

OTHER PUBLICATIONS

Santoyo et al., Chemical composition and antimicrobial activity of *Rosmarinus officinalis* L. essential oil obtained via supercritical fluid extraction, Journal of Food Protection, 2005, 68(4):790-795.

Skierkowski, Sodium Lauryl Sulfate and its Uses, Retrieved from https://web.archive.org/web/20160124134559/https://newtechbio.com/wiki/index.php?title=Sodium_Lauryl_Sulfate_and_its_Uses, Version Captured on Jan. 24, 2016 via Internet Archive Wayback Machine, 1 page.

PCT International Search Report and Written Opinion, PCT/US2022/050376, Mar. 24, 2023, 19 pages.

Chilean National Institute of Industrial Property (INAPI), Expert Examiner Report on Application for Invention Patent, Application No. 202401435, Jul. 15, 2025, 31 pages.

NIH: National Library of Medicine, National Center for Biotechnology Information, PubChem, Spearmint Oil, PubChem Reference Collection SID: 482021574, Retrieved from https://pubchem.ncbi.nlm.nih.gov/compound/Spearmint%20Oil, Version Accessed on Jan. 2, 2026, 20 pages.

NIH: National Library of Medicine, National Center for Biotechnology Information, PubChem, Essential oils, rosemary, PubChem Reference Collection SID: 505586911, Retrieved from https://pubchem.ncbi.nlm.nih.gov/compound/Rosemary%20Oil, Version Accessed on Jan. 2, 2026, 17 pages.

NIH: National Library of Medicine, National Center for Biotechnology Information, PubChem, Ethyl Lactate, PubChem CID: 7344, Retrieved from https://pubchem.ncbi.nlm.nih.gov/compound/7344, Version Accessed on Jan. 2, 2026, 96 pages.

NIH: National Library of Medicine, National Center for Biotechnology Information, PubChem, Isopropyl Myristate, PubChem CID: 8042, Retrieved from https://pubchem.ncbi.nlm.nih.gov/compound/8042, Version Accessed on Jan. 2, 2026, 83 pages.

NIH: National Library of Medicine, National Center for Biotechnology Information, PubChem, Mineral Oil, PubChem Reference Collection SID: 482026796, Retrieved from https://pubchem.ncbi.nlm.nih.gov/compound/Mineral%20Oil, Version Accessed on Jan. 2, 2026, 56 pages.

NIH: National Library of Medicine, National Center for Biotechnology Information, PubChem, Carbon Dioxide, PubChem CID: 280, Retrieved from https://pubchem.ncbi.nlm.nih.gov/compound/280, Version Accessed on Jan. 2, 2026, 151 pages.

Özcan et al., Chemical composition and antifungal activity of rosemary (*Rosmarinus officinalis* L.) oil from Turkey, International Journal of Food Sciences and Nutrition, 2008, 59(7-8):691-698.

Hussain et al., Rosmarinus officinalis essential oil: antiproliferative, antioxidant and antibacterial activities, Brazilian Journal of Microbiology, 2010, 41:1070-1078.

Hussain et al., Chemical composition, and antioxidant and antimicrobial activities of essential oil of spearmint (*Mentha spicata* L.) from Pakistan, Journal of Essential Oil Research, 2010, 22(1):78-84.

Snoussi et al., Mentha spicata essential oil: Chemical composition, antioxidant and antibacterial activities against planktonic and biofilm cultures of *Vibrio* spp. strains, Molecules, 2015, 20(8):14402-14424.

Scherer et al., Antioxidant and antibacterial activities and composition of Brazilian spearmint (*Mentha spicata* L.), Industrial Crops and Products, 2013, 50:408-413.

* cited by examiner

WATER-BASED INSECTICIDAL AND INSECT REPELLENT COMPOSITIONS

CROSS REFERENCE TO RELATED APPLICATIONS

This application is related to, claims priority to, and incorporates herein by reference for all purposes U.S. Provisional Patent Application No. 63/280,982, filed Nov. 18, 2021, and U.S. Provisional Patent Application No. 63/280,986, filed on Nov. 18, 2021.

REFERENCE REGARDING FEDERALLY SPONSORED RESEARCH OR DEVELOPMENT

Not applicable.

SEQUENCE LISTING

Not applicable.

BACKGROUND

1. Technology Field

The present disclosure relates to a pest control composition, and more particularly to a water-based insecticidal composition, including at least one mint oil (e.g., one of spearmint, peppermint, and cornmint oil) and rosemary oil. In further embodiments, the present disclosure also relates to an insecticidal or insect repellent composition that includes an active component having at least spearmint oil and rosemary oil.

2. Description of the Background

Pest control compositions, including insecticide and insect repellent compositions have been used over the years to prevent insects from attacking humans, animals, and crops. Various chemicals and mixtures have been studied for pesticidal activity over the years, but there is still the need to obtain an insecticide and insect repellent composition that is natural and selective for invertebrates, such as insects, and does not damage the environment.

In addition, most of the insecticide and insect repellent compositions in the market use oil-based organic solvents (e.g., mineral oil or other petroleum-based solvents) as a carrier in their products, as most active ingredients that kill and/or repel insects are readily soluble in oil-based organic solvents. However, a potential disadvantage of employing oil-based organic solvents in insecticide and insect repellent compositions includes the unpleasant, harsh, and lingering chemical odor typical of common oil-based organic solvents (e.g., mineral oil or other petroleum-based solvents).

Therefore, it is also desirable to have a pest control composition, including an insecticidal or an insect repellent composition that reduces the unpleasant, harsh, and lingering chemical odor and at the same time does not sacrifice the efficacy of the composition.

SUMMARY

Embodiments of the current disclosure describe a pest control composition, for example an insecticidal composition and an insect repellent composition that includes at least one mint oil (e.g., spearmint oil, peppermint oil, and/or cornmint oil) and rosemary oil. In the present disclosure, Applicant demonstrates that a combination of at least two essential oils unexpectedly provides a pleasant smell, a low linger scent, and a high efficiency of killing and repelling insects.

In an embodiment, the present disclosure provides a pest control composition that includes an active component having between about 0.1 wt. % and about 15 wt. % spearmint oil, and between about 0.05 wt. % and about 5 wt. % rosemary oil. In this embodiment, the composition further includes a carrier, a solvent, and a surfactant, and all weight percentages are percent by weight of the total composition.

In some embodiments, the active component is between about 6 wt. % and about 9 wt. %. In other embodiments, the spearmint oil is between about 1.5 wt. % and about 7.5 wt. %, and the rosemary oil is between about 0.8 wt. % and about 4.2 wt. %. In further embodiments, the weight ratio of the spearmint oil to rosemary oil is from about 1.5:1 to about 2.2:1.

In other embodiments, the carrier includes water, and in particular embodiments, the carrier is water. In further embodiments, the solvent is selected from the group consisting of ethyl lactate, butyl lactate, isopropyl alcohol, isopropyl myristate, and combinations thereof. In some embodiments, the surfactant is also selected from the group consisting of lecithin, sodium lauryl sulfate, sodium oleate, potassium oleate, sodium ricinolate, Quillaja saponin, polyglyceryl oleate, glyceryl monooleate, and any combinations thereof.

In some embodiments, the composition includes between about 0 wt. % and about 3.0 wt. % sodium lauryl sulfate, between about 0.1 wt. % and about 4 wt. % of the surfactant, between about 0.1 wt. % and about 0.5 wt. % by weight of a preservative, between about 1 wt. % and about 5 wt. % of a propellant, between about 45 wt. % and about 75 wt. % of the carrier, and between about 1 wt. % and about 44 wt. % of the solvent. Additionally, in some embodiments, the propellant is selected from the group consisting of compressed gas propellants, liquified gas propellants, saturated hydrocarbons, mixtures of liquified gas and compressed gas, methane, ethane, propane, pentane, isobutene, n-butane, isobutane, dimethyl ether, 1, 1-difluoroethane, 1,1,1,2-tetrafluoroethane, carbon dioxide, nitrogen, air, and any combinations thereof. More so, in other embodiments, the spearmint oil is in a higher weigh percentage concentration than the rosemary oil.

According to another embodiment of the present disclosure, another pest control composition is provided. In this embodiment, the composition includes an active component that includes between about 0.05 wt. % and about 5 wt. % rosemary oil, between about 0.1 wt. % and about 15 wt. % of at least one mint oil. Further, in this embodiment, the composition also includes a carrier, a solvent, and a surfactant.

In these embodiments, the mint oil may be selected from the group consisting of spearmint oil, peppermint oil, cornmint oil, and combinations thereof. Further, in some embodiments, the composition includes between about 0.1 wt. % and about 4 wt. % of the surfactant, about 0.1 wt. % and about 0.5 wt. % by weight of a preservative, about 1 wt. % and about 5 wt. % of a propellant, about 45 wt. % and about 75 wt. % of the carrier, and about 1 wt. % and about 44 wt. % of the solvent. Further, in some embodiments, the composition includes between about 0 wt. % to about 3 wt. % sodium lauryl sulfate, In other embodiments, the mint oil and the rosemary oil have a weight ratio of from 1:1 to 3:1. In further embodiments, the carrier may include water. Additionally, the solvent may be selected from the group consisting of ethyl lactate, butyl lactate, isopropyl alcohol, isopropyl myristate, and combinations thereof. In other embodiments, the surfactant is selected from the group consisting of lecithin, sodium lauryl sulfate, sodium oleate, potassium oleate, sodium ricinolate, Quillaja saponin, polyglyceryl oleate, glyceryl monooleate, and any combinations thereof. In particular embodiments, the mint oil is spearmint oil. Even further, in some embodiments, the propellant may be selected from the group consisting of methane ethane, propane, pentane, isobutene, n-butane, isobutane, dimethyl ether, 1, 1-difluoroethane, 1,1,1,2-tetrafluoroethane, carbon dioxide, nitrogen, air, and any combinations thereof.

According to another embodiment of the present disclosure, yet another pest control composition is provided. In this embodiment, the composition includes an active component that includes between about 1.5 wt. % and about 7.5 wt. % of a mint oil, between about 0.05 wt. % and about 5 wt. % rosemary oil. Here, the mint oil is selected from the group consisting of spearmint oil, peppermint oil, cornmint oil, and combinations thereof. Further, the composition includes between about 0 wt. % and about 3.0 wt. % sodium lauryl sulfate, about 45 wt. % and 75 wt. % water, about 3 wt. % and about 25 wt. % of at least one solvent, about 0.1 wt. % and about 4 wt. % of at least one surfactant, and about 0.1 wt. % to about 0.5 wt. % of at least one preservative. Further, the weight ratio of the spearmint oil to rosemary oil is from about 1:1 to about 3:1.

DETAILED DESCRIPTION

The term "about" or "approx.", as used herein, refers to variation in the numerical quantity that may occur, for example, through typical measuring and liquid handling procedures used for making concentrates or solutions in the real world; through inadvertent error in these procedures; through differences in the manufacture, source, or purity of the ingredients used to make the compositions or carry out the methods; and the like. The term "about" may also encompass amounts that differ due to different equilibrium conditions for a composition resulting from a particular initial mixture. In one embodiment, the term "about" refers to a range of values+/−5% of a specified value.

The term "weight percent", "wt. %," "percent by weight", "% by weight", and variations thereof, as used herein, refer to the concentration of a substance as the weight of that substance divided by the total weight of the composition and multiplied by 100. It is understood that, as used here, "percent", "%", and the like may be synonymous with "weight percent", "%", etc.

As used herein, "pests" can mean any organism whose existence it can be desirable to control. Pests can include, for example, bacteria, cestodes, fungi, insects, nematodes, parasites, plants, and the like. In addition, as used herein, "pesticidal" can mean, for example, antibacterial, antifungal, antiparasitic, herbicidal, insecticidal, and the like.

More so, for purposes of simplicity, the term "insect" is used in this application. However, it should be understood that the term "insect" refers, not only refers to insects, but may also to mites, spiders, and other arachnids, larvae, and like invertebrates. Further, for purposes of this application, the term "pest control" shall refer to having a repellent effect, a pesticidal effect, or both. "Repellent effect" is an effect wherein more insects are repelled away from a host or area that has been treated with the composition than a control host or area that has not been treated with the composition. Similarly, the term "repelling" or "repel" refers to the ability of the compositions described herein to cause a pest or insect to deviate away from or avoid a surface, object or insect breeding site treated with said composition. In some embodiments, as will be shown in the present disclosure, a repellent effect is an effect wherein at least about 75% of insects are repelled away from a host or area that has been treated with the composition. In some embodiments, however, a repellent effect is an effect wherein at least about 90% of insects are repelled away from a host or area that has been treated with the composition. In addition, "pesticidal effect" or "insecticidal effect" is an effect wherein treatment with a composition causes at least about 1% of the insects to die. In this regard, an LC1 to LC100 (lethal concentration) or an LD1 to LD100 (lethal dose) of a composition will cause a pesticidal effect. In some embodiments, the pesticidal effect or the insecticidal effect is an effect wherein treatment with a composition causes at least about 5% of the exposed insects to die. In some embodiments, the target pest is a non-insect, such as a parasite.

As used herein, the term "killing" or "kill" refers to the ability of at least one active ingredient in a composition to render an insect dead. As further used herein, the term "knocking down" or "knockdown" refers to the ability of the composition described herein to render an insect immobile for a pre-determined period of time. For example, a flying insect contacted with a composition described herein is said to be "knocked-down" if it falls to ground and is unable to fly, even though it may be able to move body parts so it cannot be categorized as completely paralyzed. The insect's ability to move, feed, reproduce, spread disease, or irritate is severely curtailed during the period in which it is knocked down.

Embodiments of the invention can be used to control parasites. The term "parasite" encompasses numerous protozoa, helminths, and ectoparasites. Protozoa may include the ameba, flagellates, ciliates, and the sporozoa. Protozoa typically infect the blood and tissue and may be transmitted through the bite of a mosquito. Protozoa are responsible for such diseases as malaria, trypanosomiasis, leishmaniasis, toxoplasmosis, and cryptosporidiosis. Helminths are typically classified into three groups, flatworms, roundworms, and thorny-headed worms. Helminths are responsible for such diseases as enterobiasis, ascariasis, taeniasis, cysticercosis, and schistosomiasis. Ectoparasites may include mosquitoes, ticks, fleas, lice, and mites. Many ectoparasites may cause disease on their own, but are even more important as vectors of a number of different pathogens, including protozoa.

In the pest control field, it is known that consumers desire a product having a reduced unpleasant, harsh, and lingering chemical odor, without sacrificing efficacy. Therefore, it is important to develop an insecticidal composition and an insect repellent composition that offer a pleasant fragrance experience and at the same time do not compromise insect killing/repelling efficacies. It has been found that an insecticidal composition and an insect repellent composition that includes a mint oil selected from the group consisting of spearmint oil, peppermint oil, and cornmint oil, and rosemary oil provides such benefits.

The pest control composition according to an embodiment of the present disclosure is a composition that includes at least one mint oil (e.g., spearmint oil, peppermint oil, and/or cornmint oil) and rosemary oil. The pest control composition according to another embodiment of the present disclosure is a composition comprising spearmint oil and rosemary oil. The compositions described herein present a novel and synergistic combination of essential oil active ingredients: a mint oil (e.g., spearmint oil, peppermint oil, and/or cornmint oil), rosemary oil, and other ingredients resulting in an improved pest control composition that offers consumers a dual action experience, pleasant low lingering hedonics, without sacrificing efficacy and/or time to achieve the desired insecticidal and/or repellent activity. The pleasant fragrance experience also allows the user to spray the pests in a room and remain in the room following application of the composition. In particular, the pest control composition described herein causes pest mortality from small to large pests by at least weakening the pest's exoskeleton and/or obstructing the pest's central nervous system, resulting in a pest knockdown rate as much as 90% in 30 seconds and a pest mortality rate as much as 100% in 24 hours. Applicant also discovered that the novel combination of mint oil (e.g., spearmint oil, peppermint oil, and/or cornmint oil) and rosemary oil unexpectedly masks or neutralizes the harsh odor of common inert ingredients (such as ethyl lactate or butyl lactate) present in insecticidal compositions.

In certain embodiments, the pest control compositions include an active component and an additional component. In some embodiments, the active component includes one or more essential oils, such as at least one mint oil (e.g., spearmint oil, peppermint oil, and cornmint oil) and rosemary oil. In further embodiments, the pest control composition may include other components, such as sodium lauryl sulfate. The compositions of the present disclosure may also include other components. In certain embodiments, for example, the compositions of the present disclosure may include a carrier, a solvent, a surfactant, a propellant, and/or a preservative.

In some embodiments, the pest control composition is a composition including essential oils consisting essentially of a mint oil (e.g., spearmint oil, peppermint oil, and cornmint oil) and rosemary oil. In other embodiments, the pest control composition is a composition for killing insects that consists essentially of spearmint oil and rosemary oil. In further embodiments, the composition for killing insect includes essential oils consisting of mint oil and rosemary oil, and in particular embodiments, the composition includes essential oils consisting of spearmint oil and rosemary oil.

In further embodiments, the pest control composition comprises a mint oil (e.g., spearmint oil, peppermint oil, and cornmint oil), rosemary oil, and a carrier. In certain embodiments, the carrier comprises water, and in particular embodiments, the carrier is water. In even further embodiments, the pest control composition comprises a mint oil, rosemary oil, a carrier, and a propellant.

In some embodiments, an active component of the pest control compositions of the present disclosure includes one or more essential oils (e.g., spearmint oil, rosemary oil, peppermint oil, cornmint oil, and any combinations thereof). In some embodiments, the active component of the pest control composition includes at least one mint oil and rosemary oil. In further embodiments, the active component of the pest control compositions also includes another component.

The total amount of the active component (e.g., the total amount of essential oils in the composition) may be from about 5 wt. %, or from about 6 wt. %, or from about 7 wt. %, or from about 8 wt. %, or from about 9 wt. %, or from about 10 wt. %, and to about 25 wt. %, or to about 22 wt. %, or to about 20 wt. %, or to about 17 wt. %, or to about 15 wt. %, or to about 12 wt. %, or to about 8 wt. %, or to about 7 wt. %, or to about 6 wt. %, or to about 4 wt. %, or to about 3 wt. %, or to about 2.5 wt. %. In an embodiment, the total amount active component is present in an amount from about t 4 wt. % to about 10 wt. %, or from about 6 wt. % to about 9 wt. %, wherein all weight percentages are percent by weight of the total composition. In an embodiment, the total amount active component is present in an amount from about 7 wt. % to about 8 wt. % wherein all weight percentages are percent by weight of the total composition. In an embodiment, the total amount active component is present in an amount of about 7.25 wt. % or about 7.5 wt. % based on the total weight of the total composition.

Essential Oils. The pest control composition according to an embodiment of the present disclosure, is a composition that includes essential oils—e.g., at least one mint oil (e.g., spearmint oil, peppermint oil, and/or cornmint oil). In certain embodiments, the pest control composition includes essential oils of spearmint and rosemary.

Particular strains of certain essential oils may be especially well-suited for use in certain insecticidal or insect repellent formulations. Additionally, the essential oils help provide a synergistic effect when combined, and in further embodiments, when combined in particular ratios. In particular embodiments, the insecticidal or insect repellent formulations include at least one mint oil (e.g., spearmint oil, peppermint oil, cornmint oil) and at least one rosemary oil. Even further, the essential oils may provide an aromatic effect or pleasant fragrance when applied to a surface.

Spearmint oil. For the purposes of this disclosure, as used herein, "spearmint oil" may refer to both extracted and synthetic versions of *Mentha spicata, Mentha crispa, Mentha crispate, Mentha cardiaca* G. (scotch spearmint), *Mentha spicata* L. var. *crispa* (Bentham) Danert (native spearmint), and/or *Mentha viridis*, and derivatives thereof. Spearmint is also known as garden mint, common mint, lamb mint, and mackerel mint. Further, spearmint oil includes a CAS registry number of 8008-79-5. Spearmint may also be a species of mint and may be native to Europe and southern temperate Asia, extending from Ireland in the west to southern China in the east. In addition, spearmint oil may have at least one of the following constituents: carvone, d-limonene, (Z)-Dihydrocarvone, menthone, β-myrcene, α-pinene, camphene, sabinene, β-pinene, myrcene, 3-octanol, p-cymene, 1,8-cineole, (Z)-β-ocimene, cis-sabinene hydrate, linalool, cis-p-menth-2-en-1-ol, cis-limonene oxide, trans-limonene oxide, borneol, δ-terpineol, 4-terpineol, α-terpineol, dihydrocarveol, cis-dihydrocarvone, trans-carveol, cis-carveol, pulegone, isobornyl acetate, iso-dihydrocarveol acetate, β-bourbonene, β-elemene, β-caryophyllene, germacrene D, germacrene A, spathulenol, caryophyllene oxide, monoterpene hydrocarbons, oxygenated monoterpenes, sesquiterpene hydrocarbons, and/or oxygenated sesquiterpenes. In particular embodiments, the spearmint oil may have at least the following major constituents: carvone, limonene, (Z)-Dihydrocarvone, 3-octanol, menthone, 1,8-cineole, and β-myrcene.

Peppermint oil. For the purposes of this disclosure, as used herein, "peppermint oil" may refer to both extracted and synthetic versions of *Mentha balsamea* Wild, *Mentha* x *piperita* L., and derivatives thereof. Peppermint can also be a hybrid mint—a cross between watermint and spearmint. Further, peppermint oil has the CAS registry number 8006-90-4, and may have at least one of the following constituents: menthol, menthone, menthyl acetate, 1,8-cineol, menthofuranne, neomenthol, isomenthone, beta-caryophyllene, germacrene D, limonene, β-pinene, terpinene-4-ol, α-pinene, (6R)-(+)-Menthofuran tr, terpinen-4-ol, (1R)-(+)-3-pulegone, germacrene, β-caryophyllene, (E)-sabinene hydrate, piperitone, and/or isomenthol. In particular embodiments, peppermint oil may have at least the following constituents: menthol, menthone, menthyl acetate, neomenthol, 1,8-cineole, (6R)-(+)-Menthofuran, isomenthone, terpinen-4-ol, (1R)-(+)-β -Pulegone, limonene, germacrene D,β-caryophyllene, (E)-Sabinene hydrate, β-pinene, piperitone, and isomenthol Cornmint oil. As used herein, "cornmint oil" may refer to both extracted and synthetic versions of *Mentha arvensis, Mentha arvensis* L., *Mentha arvensis* f. piperascens Malinv. Ex Holmes, *Mentha arvensis* L. var. galbrata Benth, *Mentha arvensis* L. var. *villosa* Benth, *Mentha canadensis* L., and derivatives thereof. Further, cornmint oil has a CAS registry number 68917-18-0. Cornmint is also known as field mint or wild mint. Further, like spearmint oil and peppermint oil, cornmint oil is a species of flowering plant in the mint family Lamiaceae. Cornmint oil may also have at least one of the following constituents: cis-beta-ocimene, β-phellandrene, gamma-terpinene, terpinolene, α-pinene, neomenthol, santene, α-thujene, p-cymene, β-farnesene, β-caryophyllene, betabourbonene, myrcene, β-myrcene, α-terpinene, delta-terpinene, limonene, β-pinene, camphene, sabinene, germacrene D, gamma-caryophyllene, delta-cardinene, ethanol, 3-methylbutanol, 3-octanol, citronellolnerol, menthol, isomenthol, α-terpineol, isopulegol, cis-carveol, pmenthan-2,5-diol, isocaryophyllenol, butanol, (Z)-3-hexenol, 2,6-nonadienol, geraniol, neoisomenthol, terpinen-4-ol, neoiso(iso) pulegol, trans-carveol, borneol, viridiflorol, acetaldehyde, 3-methylbutanal, geranial, 2-methylpropanal, 2,6-nonadienal, neral, acetone, 2-heptanone, 2-isopropylcyclopentanone, 3-methylcyclohexanone, menthone, piperitone, carvone, 2-butanone, methylheptenone, cis-jasmone, carvomenthone, isomenthone, pulegone, (1R)-(+)-β-pulegone, iso-isopulegol, formic acid, 3-methylbutanoic acid, hexanoic acid, nonanoic acid, acetic acid, pentanoic acid, (E)-2-hexenyl acetate, (Z)-3-hexenyl acetate, l-octen-3-yl acetate, geranyl acetate, linalyl acetate, menthyl acetate, isomenthyl acetate, neomenthyl acetate, neoisomenthyl acetate, dihydrocarvyl acetate, (Z)-3-hexenyl 3-methylbutanoate, menthyl 3-methylbutanoate, menthyl pentanoate, (Z)-3-hexenyl hexanoate, menthyl hexanoate, (Z)-3-hexenyl 2-hydroxybenzoate, (E)-2-hexenyl phenylacetate, (Z)-3-hexenyl phenylacetate, 3-phenylpyridine, 3-phenyl-4-propylpyridine, menthofuran, menthofurolactone, 1,8-cineole, trans-2,5-diethylfuran, 3-(5,5-dimethyltetrahydro-2-furyl)-(Z)-2-butenol-1, piperitone oxide, beta-caryophyllene oxide, and/or 2-isopropyl-5-methylphenol (thymol). In particular embodiments, cornmint oil may include the following major constituents: menthol and menthone.

In certain embodiments, the pest control composition includes between about 0.1% to about 15% by weight of a mint oil (e.g., spearmint oil, peppermint oil, cornmint oil), based on the total weight of the composition. In other embodiments, the pest control composition includes between about 0.2% to about 14% by weight of a mint oil (e.g., spearmint oil, peppermint oil, cornmint oil), based on the total weight of the composition. In further embodiments, the pest control composition includes between about 0.3% to about 12% by weight of a mint oil (e.g., spearmint oil, peppermint oil, cornmint oil), based on the total weight of the composition. In even further embodiments, the pest control composition includes between about 0.4% to about 11% by weight of a mint oil (e.g., spearmint oil, peppermint oil, cornmint oil), based on the total weight of the composition. In some embodiments, the pest control composition includes between about 0.5% to about 10% by weight of a mint oil (e.g., spearmint oil, peppermint oil, cornmint oil), based on the total weight of the composition. In even further embodiments, the pest control composition includes between about 0.7% to about 9% by weight of a mint oil (e.g., spearmint oil, peppermint oil, cornmint oil), based on the total weight of the composition. In some other embodiments, the pest control composition includes between about 0.9% to about 8.5% by weight of a mint oil (e.g., spearmint oil, peppermint oil, cornmint oil), based on the total weight of the composition. In further embodiments, the pest control composition includes between about 1.3% to about 8% by weight of a mint oil (e.g., spearmint oil, peppermint oil, cornmint oil), based on the total weight of the composition. In even further embodiments, the pest control composition includes between about 1.5% to about 7.5% by weight of a mint oil (e.g., spearmint oil, peppermint oil, cornmint oil), based on the total weight of the composition. In accordance with exemplary embodiments, the mint oil is present in an amount of about 1.50%, 2.5%, 4.70%, or 7.5%, by weight of the total composition. While specific values chosen for this embodiment are recited, it is to be understood that, within the scope of the disclosure, the concentrations of the spearmint oil may vary to suit different applications. The concentration ranges of spearmint oil will vary based on the additional components of the pest control composition, such as the rosemary oil or the carrier.

In further embodiments, the composition is a composition for repelling insects, and according to this embodiment, the composition includes at least one mint oil (e.g., spearmint oil, peppermint oil, and cornmint oil). In some embodiments, the composition for repelling insects includes between about 5% to about 50% by weight of a mint oil, based on the total weight of the composition. In other embodiments, the composition for repelling insects includes between about 10% to about 45% by weight of a mint oil, based on the total weight of the composition. In further embodiments, the composition for repelling insects includes between about 15% to about 40% by weight of a mint oil, based on the total weight of the composition. In even further embodiments, the composition for repelling insects includes between about 15% to about 35% by weight of a mint oil, based on the total weight of the composition. In other embodiments, the composition for repelling insects includes between about 20% to about 35% by weight of a mint oil, based on the total weight of the composition. In particular embodiments, the composition for repelling insects includes between about 25% to about 33% by weight of a mint oil, based on the total weight of the composition. In an exemplary embodiment, the composition includes about 32.5% of spearmint oil, based on the total weight of the composition. While specific values chosen for this embodiment are recited, it is to be understood that, within the scope of the disclosure, the concentration of the spearmint oil may vary to suit different applications. The concentration ranges of the spearmint oil will vary based on the additional components of the repellent composition, such as the rosemary oil.

Rosemary oil. As used herein, "rosemary oil" may refer to both extracted and synthetic versions of *Rosmarinus officinalis, Limonium vulgare, Andromeda polifolia*, and derivatives thereof. Further, rosemary oil includes a CAS registry number of 8000-25-7, and may include at least one of the following constituents: tricyclene, alpha-thujene, alpha-pinene, camphene, sabinene, beta-pinene, myrcene, alpha-phellandrene, car-3-ene, alpha-terpinolene, p-cymene, 1,8-cineole, limonene, gamma-terpinene, trans-sabinene, terpinolene, linalool, alpha-campholenol, endo-fenchol, and/or camphor. In particular embodiments, rosemary oil may include the following major constituents: 1,8-cineole, borneol, camphor, verbenone, α-pinene, bornyl acetate, linalool, camphene, β-caryophyllene, α-terpineol, p-cymene, ar-curcumene, 1-nonanol, and terpinen-4-ol.

In certain embodiments, the pest control composition includes between about 0.05% to about 5% by weight of rosemary oil, based on the total weight of the composition. In other embodiments, the pest control composition includes between about 0.1% to about 4.9% by weight of rosemary oil, based on the total weight of the composition. In further embodiments, the pest control composition includes between about 0.2% to about 4.8% by weight of rosemary oil, based on the total weight of the composition. In even further embodiments, the pest control composition includes between about 0.3% to about 4.7% by weight of rosemary oil, based on the total weight of the composition. In some embodiments, the pest control composition includes between about 0.4% to about 4.6% by weight of rosemary oil, based on the total weight of the composition. In other embodiments, the pest control composition includes between about 0.5% to about 4.5% by weight of rosemary oil, based on the total weight of the composition. In further embodiments, the pest control composition includes between about 0.6% to about 4.4% by weight of rosemary oil, based on the total weight of the composition. In even further embodiments, the pest control composition includes between about 0.7% to about 4.3% by weight of rosemary oil, based on the total weight of the composition. In other embodiments, the pest control composition includes between about 0.8% to about 4.2% by weight of rosemary oil, based on the total weight of the composition. In accordance with exemplary embodiments, the rosemary oil is present in an amount of about 0.82%, 1.36%, 2.57%, or 4.1%, by weight of the total composition. While specific values chosen for this embodiment are recited, it is to be understood that, within the scope of the disclosure, the concentrations of the rosemary oil may vary to suit different applications. The concentration ranges of rosemary oil will vary based on the additional components of the pest control composition, such as the mint oil or the carrier.

In certain embodiments, the composition for repelling insects includes between about 5% to about 50% by weight of rosemary oil, based on the total weight of the composition. In some embodiments, the composition for repelling insects comprises between about 7% to about 45% by weight of rosemary oil, based on the total weight of the composition. In further embodiments, the composition for repelling insects comprises between about 9% to about 40% by weight of rosemary oil, based on the total weight of the composition. In even further embodiments, the composition for repelling insects includes between about 11% to about 35% by weight of rosemary oil, based on the total weight of the composition. In other embodiments, the composition for repelling insects includes between about 13% to about 30% by weight of rosemary oil, based on the total weight of the composition. In further embodiments, the composition for repelling insects comprises between about 10% to about 25% by weight of rosemary oil, based on the total weight of the composition. In some embodiments, the composition for repelling insects includes between about 15% to about 25% by weight of rosemary oil, based on the total weight of the composition. In even further embodiments, the composition for repelling insects includes between about 17% to about 20% by weight of rosemary oil, based on the total weight of the composition. In an exemplary embodiment, the composition includes about 17.5% of rosemary oil, based on the total weight of the composition. While specific values chosen for this embodiment are recited, it is to be understood that, within the scope of the disclosure, the concentration of the rosemary oil may vary to suit different applications. The concentration ranges of the rosemary oil will vary based on the additional components of the repellent composition, such as the mint oil.

In other embodiments, the composition includes geraniol. In this embodiment, the geraniol is present in an amount from about 45% to about 55% by weight, based on the total weight of the composition.

In certain embodiments, the at least one mint oil, such as a spearmint oil, is higher in weight percent in the composition than the rosemary oil. For example, in certain embodiments, the at least one mint oil (e.g., spearmint oil, peppermint oil, cornmint oil) and the rosemary oil have a weight ratio of from about 1:1 to about 3:1. In other embodiments, the at least one mint oil (e.g., spearmint oil, peppermint oil, cornmint oil) and the rosemary oil have a weight ratio of from about 1.1:1 to about 2.8:1. In further embodiments, the at least one mint oil (e.g., spearmint oil, peppermint oil, cornmint oil) and the rosemary oil have a weight ratio of from about 1.2:1 to about 2.6:1. In even further embodiments, the at least one mint oil (e.g., spearmint oil, peppermint oil, cornmint oil) and the rosemary oil have a weight ratio of from about 1.3:1 to about 2.4:1. In certain embodiments, the at least one mint oil (e.g., spearmint oil, peppermint oil, cornmint oil) and the rosemary oil have a weight ratio of from about 1.5:1 to about 2.2:1. In further embodiments, the at least one mint oil (e.g., spearmint oil, peppermint oil, cornmint oil) and the rosemary oil have a weight ratio of from about 1.6:1 to about 2:1. In even further embodiments, the at least one mint oil (e.g., spearmint oil, peppermint oil, cornmint oil) and the rosemary oil have a weight ratio of from about 1.7:1 to about 1.9:1. In accordance with an exemplary embodiment, the at least one mint oil (e.g., spearmint oil, peppermint oil, cornmint oil) and the rosemary oil have a weight ratio of about 1.8:1. While specific ratios chosen for this embodiment are recited, it is to be understood that, within the scope of the disclosure, the ratios of the mint oil and the rosemary oil may vary to suit different applications.

In certain embodiments, the pest control composition includes the at least one mint oil (e.g., spearmint oil, peppermint oil, cornmint oil), rosemary oil, and a carrier. In further embodiments, the at least one mint oil (e.g., spearmint oil, peppermint oil, cornmint oil) is higher in weight percent in the composition than the rosemary oil. In even further embodiments, the at least one mint oil (e.g., spearmint oil, peppermint oil, cornmint oil) and the rosemary oil have a weight ratio of from about 1:1 to about 3:1. In other embodiments, the at least one mint oil (e.g., spearmint oil, peppermint oil, cornmint oil) and the rosemary oil have a weight ratio of from about 1.1:1 to about 2.8:1. In some embodiments, the at least one mint oil (e.g., spearmint oil, peppermint oil, cornmint oil) and the rosemary oil have a weight ratio of from about 1.2:1 to about 2.6:1. In further embodiments, the at least one mint oil (e.g., spearmint oil, peppermint oil, cornmint oil) and the rosemary oil have a weight ratio of from about 1.3:1 to about 2.4:1. In even further embodiments, the at least one mint oil (e.g., spearmint oil, peppermint oil, cornmint oil) and the rosemary oil have a weight ratio of from about 1.5:1 to about 2.2:1. In certain embodiments, the at least one mint oil (e.g., spearmint oil, peppermint oil, cornmint oil) and the rosemary oil have a weight ratio of from about 1.6:1 to about 2:1. In some embodiments, the at least one mint oil (e.g., spearmint oil, peppermint oil, cornmint oil) and the rosemary oil have a weight ratio of from about 1.7:1 to about 1.9:1. In accordance with an exemplary embodiment, the at least one mint oil (e.g., spearmint oil, peppermint oil, cornmint oil) and the rosemary oil have a weight ratio of about 1.8:1. While specific ratios chosen for this embodiment are recited, it is to be understood that, within the scope of the disclosure, the ratios of the spearmint oil and the rosemary oil may vary to suit different applications.

Other plant-based insecticidal natural oils or natural oil extracts or natural oil fractions that may be contained in the embodiments of compositions for killing insects and/or repelling insects described herein may comprise, by way of example only and are not limited to, neem oil, karanja oil, clove oil, thyme oil, oregano oil, garlic oil, anise oil, lime oil, lavender oil, thymol (found in oregano oil and thyme oil, for example), p-cymene (found in oregano oil and thyme oil, for example), 1,8-cineole (found in thyme oil and peppermint oil, for example), eugenol (found in clove oil and cinnamon oil, for example), limonene (found in cinnamon, peppermint, and lime oil, for example), alpha-pinene (found in cinnamon oil, geranium oil, and lime oil, for example), carvacrol (found in oregano oil, thyme oil, and clove oil, for example), gamma-terpinene (found in oregano oil and lime oil, for example), geraniol (found in thyme oil and geranium oil, for example), alpha-Terpineol (found in thyme oil and anise oil, for example), beta-caryophyllene (found in clove oil, cinnamon oil, and peppermint oil, for example) and linalool (found in thyme oil, cinnamon oil and geranium oil, amongst others), or mixtures thereof. In other embodiments, the insecticidal natural oil may comprise any oil having as a constituent one of the following compounds, or a combination of the following compounds: azadirachtin, nimbin, nimbinin, salannin, gedunin, geraniol, geranial, gamma-terpinene, alpha-terpin-eol, beta-caryophyllene, terpinen-4-ol, myrcenol-8, thuya-nol-4, benzyl alcohol, cinnamaldehyde, cinnamyl acetate, alpha-pinene, geranyl acetate, citronellol, citronellyl formate, isomenthone, 10-epi-gamma-eudesmol, 1,5-dimethyl-1-vinyl-4-hexenylbutyrate, 1,3,7-octatriene, eucalyptol, camphor, diallyl disulfide, methyl allyl trisulfide, 3-vinyl-4H-1,2 dithiin, 3-vinyl-1,2 dithiole-5-cyclohexane, diallyl trisulfide, anethole, methyl chavicol, anisaldehyde, estragole, linalyl acetate, geranial, beta-pinene, thymol, carvacrol, p-cymene, beta-myrcene, alpha-myrcene, 1,8-cin-eole, eugenol, limonene, alpha-pinene, menthol, menthone, linalool, or mixtures thereof.

In further embodiments, other plant-based essential oils, or extracts, or fractions thereof that may be contained in the embodiments of compositions for killing insects and/or repelling insects described herein may comprise alpha- or beta-pinene; alpha-camp-holenic aldehyde; alpha-citronellol; alpha-iso-amyl-cinnamic (e.g., amyl cinnamic aldehyde); alpha-pinene oxide; alpha-cinnamic terpinene; alpha-terpineol (e.g., 1-methyl-4-isopropyl-1-cyclohexen-8-01); lamda-terpinene; achillea; aldehyde C16 (pure); allicin; alpha-phellandrene; amyl cinnamic aldehyde; amyl salicylate; anethole; anise; aniseed; anisic aldehyde; basil; bay; benzyl acetate; benzyl alcohol; bergamot (e.g., *Monardia fistulosa, Monarda didyma, Citrus bergamia, Monarda punctata*); bitter orange peel; black pepper; borneol; calamus; camphor; cananga oil (e.g., java); cardamom; carnation (e.g., *Dianthus caryophyllus*); carvacrol; carveol; cassia; castor; cedar (e.g., hinoki); chamomile; cineole; cinnamaldehyde; cinnamic alcohol; cis-pinane; citral (e.g., 3,7-dimethyl-2,6-octadienal); citronella; citronellal; citronellol dextro (e.g., 3-7-dimethyl-6-octen-1-ol); citronellol; citronellyl acetate; citronellyl nitrile; *Citrus unshiu*; clary sage; clove (e.g., *Eugenia caryophyllus*); clove bud; coriander; corn; cotton seed; d-dihydrocarvone; decyl aldehyde; diallyl di sulfide; diethyl phthalate; dihydroanethole; dihydrocarveol; dihydrolinalool; dihydromyrcene; dihydromyrcenol; dihydromyrcenyl acetate; dihydroterpineol; dimethyl salicylate; dimethyloctanal; dimethyloctanol; dimethyloctanyl acetate; diphenyl oxide; dipropylene glycol; d-limonene; d-pulegone; estragole; ethyl vanillin (e.g., 3-ethoxy-4-hydrobenzaldehyde); eucalyptol (e.g., cineole); *Eucalyptus citriodora; Eucalyptus globulus*; eucalyptus; eugenol (e.g., 2 -methoxy-4-allyl phenol); evening primrose; fenchol; fennel; Femiol™; fish; florazon (e.g., 4-ethyl-.alpha., .alpha.-dimethyl-benzenepropanal); galaxolide; geraniol (e.g., 2-trans-3,7-dimethyl-2,6-octadien-8-ol); geraniol; geranyl acetate; geranyl nitrile; ginger; grapefruit; guaiacol; guaiacwood; gurjun balsam; heliotropin; herbanate (e.g., 3-(1-methyl-ethyl) bicyclo(2,2,1) hept-5-ene-2-carboxylic acid ethyl ester); hiba; hydroxycitronellal; i-carvone; i-methylacetate; ionone; isobutyl quinoleine (e.g., 6-secondary butyl quinoline); isobornyl acetate; isobornyl methylether; isoeugenol; isolongifolene; jasmine; jojoba; juniper berry; lavender; lavandin; lemon grass; lemon; lime; limonene; linallol oxide; linallol; linalyl acetate; linseed; *Litsea cubeba*; I-methyl acetate; longifolene; mandarin; mentha; menthane hydroperoxide; menthol crystals; menthol laevo (e.g., 5-methyl-2-isopropyl cyclohexanol); menthol; menthone laevo (e.g., 4-isopropyl-1-methylcyclohexan-3-one); methyl anthranilate; methyl cedryl ketone; methyl chavicol; methyl hexyl ether; methyl ionone; mineral; mint; musk ambrette; musk ketone; musk xylol; mustard (also known as allylisothio-cyanate); myrcene; nerol; neryl acetate; nonyl aldehyde; nutmeg (e.g., *Myristica fragrans*); orange (e.g., *Citrus aurantium dulcis*); orris (e.g., *Iris florentina*) root; para-cymene; para-hydroxy phenyl butanone crystals (e.g., 4-(4-hydroxphenyl)-2-butanone); passion palmarosa oil (e.g., *Cymbopogon martini*), patchouli (e.g., *Pogostemon cablin*), p-cymene; pennyroyal oil; pepper; peppermint (e.g., *Mentha piperita*), perillaldehyde; petitgrain (e.g., *Citrus aurantium amara*); phenyl ethyl alcohol; phenyl ethyl propionate; phenyl ethyl-2-methylbutyrate; pimento berry; pimento leaf; pinane hydroperoxide; pinanol; pine ester; pine needle; pine; pinene; piperonal; piperonyl acetate; piperonyl alcohol; plinol; plinyl acetate; pseudo ionone; rhodinol; rhodinyl acetate; rosalin; rose; ryu; sage; sandalwood (e.g., Santa-lum album), sandenol; sassafras; sesame; soybean; spice; spike lavender; spirantol; starflower; tangerine; tea seed; tea tree; terpenoid; terpineol; terpinolene; terpinyl acetate; tert-butylcyclohexyl acetate; tetrahydrolinalool; tetrahydrolinalyl acetate; tetrahydromyrcenol; thulasi; thyme; thymol; tomato; trans-2-hexenol; trans-anethole and metabolites thereof; turmeric; turpentine; vanillin (e.g., 4-hydroxy-3-methoxy benzaldehyde); vetiver; vitalizair; white cedar; white grapefruit; wintergreen (methyl salicylate) oils, or mixtures thereof.

Other suitable essential oils for use in the insecticidal and repellent compositions described herein may include, but are not limited to, Absinth Oil, Almond Oil, Ambrette Seed Oil, Amyris Oil, Angelica Root Oil, Anethole 20/21 natural, Angelica Seed Oil, Aniseed Oil China star, Anise Star Oil, Balsam Fir Oil, Balsam Oil, Basil Oil, Bay Oil, Bergamot Oil, Birch Sweet Oil, Birch Tar Oil, Bitter Almond Oil, Bitter Orange Oil Cold Pressed, Black Pepper Oil Black Pepper Oleoresin 40/20, Bois de Rose, Buchu Oil, Cabreuva Oil, Cade Oil, Cajeput Oil, Calamus Oil, Camphor Oil White, Cananga Oil, Capsicum Oil, Caraway Seed Oil, Cardamom Seed Oil, Carrot Seed Oil, Cassia Oil, Cedar leaf Oil, Cedarwood Oil, Celery Leaf Oil, Celery Seed Oil, Chamomile Flower Oil, Chenopodium Oil (Wormseed), Cinnamon Bark Oil, Cinnamon Leaf Oil, Cistus Oil, Citronella Oil, Citronellol Terpenes, Clary Sage Oil, Clove Bud Oil, Clove Leaf Oil, Clove Stem Oil, Cognac Oil Green, Cognac Oil White, Copaiba Oil, Coriander Leaf Oil, Coriander Seed Oil, Cornmint Oil (*Mentha Arvensis*), Cumin Seed Oil, Cyclamen Oil, Cypress Oil, Davana Oil, Dill Herb Oil, Erigeron Oil, Estragon Oil (Tarragon Oil), Eucalyptus Oil, Fennel Oil Bitter, Fennel Oil Sweet, Fir Needle Oil, Galbanum Oil, Garlic Oil, Geranium Oil, Ginger Oil, Grapefruit Oil 10-Fold, Grapefruit Oil 5-Fold, Grapefruit Oil Cold Pressed, Grapefruit Oil Terpenes, Guaiac Wood Oil, Gurjun Balsam, Hemlock Oil (Spruce), Ho Leaf Oil, Ho Wood Oil, Hyssop Oil, Jasmin Oil, Juniper Berry Oil, Laurel Leaf Oil, Lavandin Oil, Lavender Oil, Lavender Spike Oil, Lemon Oil 10-Fold, Lemon Oil 5-Fold, Lemon Oil Cold Pressed, Lemon Oil Distilled, Lemon Oil Terpenes, Lemon Oil Washed, Lemongrass Oil, Lemongrass Oil Terpeneless, Lime Oil 5-Fold, Lime Oil Distilled, Lime Oil Terpenes, Lime Oil Washed, *Litsea Cubeba* Berry Oil, Mace Oil, Mandarin Oil Cold Pressed, Marjoram Oil Sweet, Musk Oil, Myrtel Oil, Neroli Oil, Nutmeg Oil, *Ocotea cymbarum* Oil, Onion Oil, Orange Oil Bitter Cold Pressed, Orange Oil 10-Fold, Orange Oil 20-Fold, Orange Oil 5-Fold, Orange Oil Bitter 5-Fold, Orange Oil Cold Pressed, Orange Oil Terpeneless, Oregano Oil, Origanum Oil, Palmarosa Oil, Parsley Leaf Oil, Parsley Seed Oil, Patchouli Oil, Pennyroyal Oil, Pepper Oil Black, Peppermint Oil, Petitgrain Oil, Pimenta Berry Oil, Pimenta Leaf Oil, Pine Needle Oil, Pine Oil Scotch, Pine Oil White, Rosalin Oil, Rose Oil, Sage Clary Oil, Sage Oil, Sandalwood Oil, Sassafras Oil, Savory Oil, Spike Lavender Oil (Lavender Spike), Spruce Oil (Hemlock), Star Anise Oil, Styrax Oil, Tagetes Oil, Tangelo Oil, Tangerine Oil, Tangerine Oil 5-Fold, Tangerine Oil Terpenes, Tarragon Oil (Estragon Oil), Tea Tree Oil, Thyme Oil, Thyme Oil White, Tumeric Oil, Purpentine Oil, Valerian Oil, Vanilla beans abs., Vetiver Oil, Wintergreen Oil (Methyl Salicylate Natural), Wormseed Oil, Wormwood Oil, and Ylang Ylang Oil.

In certain circumstances, the composition may include one or more ingredients eligible for minimum risk pesticide products that are exempt from the Federal Insecticide, Fungicide, and Rodenticide Act (FIFRA) under the Minimum Risk Exemption regulations in 40 U.S. Code of Federal Regulations 152.25(f), for example, included, but not limited to, those listed as "Active Ingredients Permitted in Exempted Minimum Risk Pesticide Products" in 40 U.S. Code of Federal Regulations 152.25(f). Included in this list is sodium lauryl sulfate, which may be considered, under certain circumstances, to serve as an active ingredient.

The compositions of the present disclosure, and the active component thereof, may also include other active ingredients other than or in addition to essential oils.

In certain embodiments, the composition includes about 0.1% to about 4% by weight of an additional active ingredient, based on the total weight of the composition. In some embodiments, the composition includes about 0.4% to about 3.9% by weight of the additional active ingredient, based on the total weight of the composition. In other embodiments, the composition includes about 0.8% to about 3.8% by weight of the additional active ingredient, based on the total weight of the composition. In further embodiments, the composition includes about 1.25% to about 3.7% by weight of the additional active ingredient, based on the total weight of the composition. In even further embodiments, however, the composition is substantially free of another active ingredient. While specific values chosen for this embodiment are recited, it is to be understood that, within the scope of the disclosure, the concentration of additional active ingredient may vary to suit different applications. The concentration ranges of surfactant will vary based on the additional components of the pest control composition, such as the mint oil, the rosemary oil, and the carrier.

The compositions of the present disclosure may also include one or more other components. In certain embodiments, for example, the compositions of the present disclosure may include a carrier, a solvent, a surfactant, a propellant, and/or a preservative.

Carrier. The term "carrier" as used herein means a, which can be inorganic or organic and of synthetic or natural origin, with which the active compound is mixed or formulated to facilitate its application to the host, area, or other object to be treated, or to facilitate its storage, transport and/or handling. In general, any of the materials customarily employed in formulating repellents, pesticides, herbicides, or fungicides, are suitable.

The pest control composition according to an embodiment of the present disclosure is a composition including at least one mint oil (e.g., spearmint oil, peppermint oil, and/or cornmint oil), rosemary oil, and a carrier. In certain embodiments, the carrier includes water, and in particular embodiments, the carrier is water.

In certain embodiments, the carrier includes about 45% to about 75% by weight, based on the total weight of the composition. In some embodiments, the carrier includes about 49% to about 74% by weight, based on the total weight of the composition. In other embodiments, the carrier includes about 60% to about 74% by weight, based on the total weight of the composition. In further embodiments, the carrier includes about 62% to about 72% by weight, based on the total weight of the composition. In even further embodiments, the carrier includes water, and in particular embodiments, the carrier is water. While specific values chosen for this embodiment are recited, it is to be understood that, within the scope of the disclosure, the amount of carrier may vary to suit different applications. The amount ranges of carrier will vary based on the additional components of the insecticidal composition, such as the spearmint oil and the rosemary oil.

Solvent. The formulation or composition of the present disclosure may also include a solvent, for example to dissolve certain components, to enhance functionality of the components, or for textural and sensorial attributes. In some embodiments, the solvent includes ethyl lactate, butyl lactate, isopropyl alcohol, isopropyl myristate, and/or combinations thereof.

In an embodiment, the solvent is present in an amount from about 1% to about 50% by weight, based on the total weight of the composition. In another embodiment, the solvent is present in about 1% to about 44% by weight, based on the total weight of the composition, or about 3% to about 25% by weight, based on the total weight of the composition. In a further embodiment, the solvent is present in about 5% to about 18% by weight, based on the total weight of the composition. In yet another embodiment, the solvent is present in about 5% to about 14% by weight, based on the total weight of the composition. In an even further embodiment, the solvent is present in about 6% to about 13% by weight, based on the total weight of the composition. Additionally, according to one embodiment, the solvent includes at least one of ethyl lactate, butyl lactate, isopropyl alcohol, isopropyl myristate, and combinations thereof. For example, in an embodiment, the solvent includes at least one of ethyl lactate, butyl lactate, isopropyl myristate, and combinations thereof. In another embodiment, the solvent includes at least one of ethyl lactate, butyl lactate, and combinations thereof. In an even further embodiment, the solvent is selected from the group consisting essentially of ethyl lactate, butyl lactate, isopropyl alcohol, isopropyl myristate, and combinations thereof.

In certain embodiments, the composition for repelling insects includes a solvent, and in these embodiments, the solvent may be present in an amount from about 45% to about 55% by weight, based on the total weight of the composition. In additional embodiments, the solvent is present in about 48% to about 52% by weight, based on the total weight of the composition. In further embodiments, the solvent is present in about 50% by weight, based on the total weight of the composition. In these embodiments, the solvent may include at least one of ethyl lactate, butyl lactate, isopropyl alcohol, propylene carbonate, and combinations thereof. In an embodiment, the solvent is selected from the group consisting essential of ethyl lactate, butyl lactate, isopropyl alcohol, propylene carbonate, and combinations thereof.

Further, in an embodiment, the solvent includes ethyl lactate. In this embodiment, the composition includes about 3% to about 15% by weight ethyl lactate, based on the total weight of the composition. In further embodiments, the composition includes about 6% to about 7% by weight ethyl lactate, based on the total weight of the composition. In even further embodiments, the composition includes about 6.4% to about 6.7% by weight ethyl lactate, based on the total weight of the composition. In some embodiments, the ethyl lactate is present in an amount from about 45% to about 55% by weight, based on the total weight of the composition. In other embodiments, however, the composition is substantially free of ethyl lactate. While specific values chosen for this embodiment are recited, it is to be understood that, within the scope of the disclosure, the concentration of ethyl lactate may vary to suit different applications. The concentration ranges of ethyl lactate, for example, will vary based on the additional components of the pest control composition, such as the spearmint oil, the rosemary oil, and the carrier.

According to embodiments of the present disclosure, the solvent may also include butyl lactate. In one embodiment, the solvent is butyl lactate. In certain embodiments, the composition includes about 3% to about 15% by weight butyl lactate, based on the total weight of the composition. In further embodiments, the composition includes about 6% to about 7% by weight butyl lactate, based on the total weight of the composition. In certain embodiments, the composition includes about 6.4% to about 6.7% by weight butyl lactate, based on the total weight of the composition. In some embodiments, butyl lactate is present in an amount from about 45% to about 55% by weight, based on the total weight of the composition. In certain embodiments, however, the composition is substantially free of butyl lactate. While specific values chosen for this embodiment are recited, it is to be understood that, within the scope of the disclosure, the concentration of butyl lactate may vary to suit different applications. The concentration ranges of butyl lactate will vary based on the additional components of the pest control composition, such as the spearmint oil, the rosemary oil, and the carrier.

According to embodiments of the present disclosure, the solvent may also include isopropyl alcohol. In certain embodiments, the solvent is isopropyl alcohol. In some embodiments, the composition includes about 30% to about 50% by weight isopropyl alcohol. In further embodiments, the composition includes about 35% to about 45% by weight isopropyl alcohol. In even further embodiments, the composition includes about 36% to about 44%% by weight, or about 37% to about 42% by weight isopropyl alcohol. In some embodiments, the isopropyl alcohol is present in an amount from about 45% to about 55% by weight, based on the total weight of the composition. In other embodiments, however, the composition is substantially free of isopropyl alcohol. While specific values chosen for this embodiment are recited, it is to be understood that, within the scope of the disclosure, the concentration of isopropyl alcohol may vary to suit different applications. The concentration ranges of isopropyl alcohol will vary based on the additional components of the pest control composition, such as the spearmint oil, the rosemary oil, and the carrier.

According to further embodiments of the present disclosure, the solvent may also include isopropyl myristate. In certain embodiments, the solvent is isopropyl myristate. In some embodiments, the composition includes about 1% to about 15% by weight isopropyl myristate, based on the total weight of the composition. In further embodiments, the composition includes about 1.5% to about 13% by weight isopropyl myristate, based on the total weight of the composition. In even further embodiments, the composition includes about 2% to about 11% by weight isopropyl myristate, based on the total weight of the composition. In other embodiments, the composition includes about 3% to about 10.4% by weight isopropyl myristate, based on the total weight of the composition. In some embodiments, however, the composition is substantially free of isopropyl myristate. While specific values chosen for this embodiment are recited, it is to be understood that, within the scope of the disclosure, the concentration of isopropyl myristate may vary to suit different applications. The concentration ranges of isopropyl myristate will vary based on the additional components of the pest control composition, such as the spearmint oil, the rosemary oil, and the carrier.

In additional embodiments, the solvent includes propylene carbonate. In these embodiments, the propylene carbonate may be present in an amount from about 45% to about 55% by weight, based on the total weight of the composition.

In certain embodiments, the pest control composition is free, or substantially free, of a hydrocarbon solvent selected from the group consisting of aliphatic C9-C17 hydrocarbons, alicyclic C9-C17 hydrocarbons, naphtha, petroleum distillate, paraffins, iso-paraffins, isoparaffinic hydrocarbons, cycloparaffins, alkanes, iso-alkanes, cycloalkanes, and any combinations thereof.

Surfactant. The formulation or composition may also include a surfactant, for example to lower the surface tension of the composition. In certain embodiments, the surfactant includes at least one of lecithin, sodium lauryl sulfate, sodium oleate, potassium oleate, sodium ricinolate, Quillaja saponin, polyglyceryl oleate, glyceryl monooleate, and any combinations thereof. In certain embodiments, the surfactant is selected from the group consisting essentially of lecithin, sodium lauryl sulfate, sodium oleate, potassium oleate, sodium ricinolate, Quillaja saponin, polyglyceryl oleate, glyceryl monooleate, and any combinations thereof. In other embodiments, the composition is substantially free of a surfactant.

In certain embodiments, the composition includes about 0.1% to about 4% by weight of the surfactant, based on the total weight of the composition. In some embodiments, the composition includes about 0.4% to about 3.9% by weight of the surfactant, based on the total weight of the composition. In other embodiments, the composition includes about 0.8% to about 3.8% by weight of the surfactant, based on the total weight of the composition. In further embodiments, the composition includes about 1.25% to about 3.7% by weight of the surfactant, based on the total weight of the composition. In even further embodiments, however, the composition is substantially free of a surfactant. While specific values chosen for this embodiment are recited, it is to be understood that, within the scope of the disclosure, the concentration of surfactant may vary to suit different applications. The concentration ranges of surfactant will vary based on the additional components of the pest control composition, such as the spearmint oil, the rosemary oil, and the carrier.

Preservative. According to even further embodiments of the present disclosure, the composition may also include a preservative, for example, to lengthen the shelf-life of the product composition. In other embodiments, the composition is substantially free of a preservative. In certain embodiments, the preservative includes sodium benzoate. In further embodiments, the preservative is sodium benzoate. In some of these embodiments, the composition includes about 0.1% to about 0.5% by weight of a preservative. In particular embodiments, the composition includes about 0.15% to about 0.45% by weight of a preservative. In further embodiments, the composition includes about 0.2% to about 0.4% by weight of a preservative. In even further embodiments, however, the composition is substantially free of a preservative. While specific values chosen for this embodiment are recited, it is to be understood that, within the scope of the disclosure, the concentration of preservative may vary to suit different applications. The concentration ranges of preservative will vary based on the additional components of the pest control composition, such as the spearmint oil, the rosemary oil, and the carrier.

Propellant. According to embodiments of the present disclosure, the composition may also include a propellant, for example to provide a force to expel the formulation from the container. Here, the insecticidally-active composition of the present disclosure may be combined with a suitable propellant to form an aerosol formulation. However, in other embodiments, the composition does not include a propellant and may be dispensed from a container manually, such as from a trigger-actuated container. In certain embodiments, the propellant includes at least one of methane, ethane, propane, pentane, isobutene, n-butane, isobutane, dimethyl ether, 1,1-difluoroethane, 1,1,1,2-tetrafluoroethane, carbon dioxide, nitrogen, air, and any combinations thereof. In some embodiments, the propellant is selected from the group consisting of methane, ethane, propane, pentane, isobutene, n-butane, isobutane, dimethyl ether, 1,1-difluoroethane, 1,1,1,2-tetrafluoroethane, carbon dioxide, nitrogen, air, and any combinations thereof. In some embodiments, the propellant is selected from the group consisting of methane, ethane, propane, pentane, isobutene, n-butane, isobutane, dimethyl ether, 1,1-difluoroethane, 1,1,1,2-tetrafluoroethane, carbon dioxide, nitrogen, air, and any combinations thereof. Examples of suitable propellants include compressed gas propellants such as nitrogen, carbon dioxide, and nitrous oxide; liquefied gas propellants such as fluorinated and chlorinated hydrocarbons, dimethyl ether, vinyl chloride; saturated hydrocarbons or lower (C1-C4) aliphatic hydrocarbons, such as propane, butane, isobutane, isopentane, and mixtures thereof; and mixtures of liquefied gases and compressed gases. In order to reduce environmental pollution, it may be preferred to employ compressed gases as the propellant rather than, or in the place of, liquefied saturated hydrocarbons.

The pest control composition according to an embodiment of the present disclosure is a composition includes spearmint oil, rosemary oil, a carrier, and a propellant.

In certain embodiments, the composition includes about 1% to about 5% by weight of the propellant, based on the total weight of the composition. In certain embodiments, the composition includes about 1.5% to about 4.5% by weight of the propellant, based on the total weight of the composition. In some embodiments, the composition includes about 2% to about 4% by weight of the propellant, based on the total weight of the composition. In further embodiments, the composition includes about 2.5% to about 3.5% by weight of the propellant, based on the total weight of the composition. In even further embodiments, the composition includes about 2.7% to about 3% by weight of the propellant, based on the total weight of the composition. In other embodiments, however, the composition is substantially free of a propellant. While specific values chosen for this embodiment are recited, it is to be understood that, within the scope of the disclosure, the concentration of propellant may vary to suit different applications. The concentration ranges of propellant will vary based on the additional components of the pest control composition, such as the spearmint oil, the rosemary oil, and the carrier. In other embodiments, the hydrocarbon propellant may be present in the compositions of this disclosure in an amount of from about 8% to about 50%, from about 15% to about 50%, from about 15% to about 40%, from about 15% to about 25%, or from about 5% to about 30% by weight, based on the total weight of the composition.

The current disclosure also describes a method of killing insects comprising applying to a surface in need thereof a composition comprising at least one mint oil, rosemary oil, and combinations thereof. Further, the current disclosure also describes a method of killing insects comprising applying to a surface in need thereof a composition comprising spearmint oil, rosemary oil, at least one of ethyl lactate, butyl lactate, isopropyl alcohol, isopropyl myristate, and combinations thereof.

Any of the embodiments described herein may be modified to include any of the structures, compositions, or methodologies disclosed herein in connection with different embodiments.

EXAMPLES

The following Examples are provided to demonstrate and further illustrate certain embodiments and aspects of the present disclosure and are not to be construed as limiting the scope of the disclosure.

In certain embodiments, as will be illustrated through the Examples, the pest control composition provides a pest mortality rate of about 100% in 24 hours, and in some embodiments, the pest control composition provides a pest knockdown rate of about 90% in 30 seconds. The current disclosure also describes a pest control composition comprising spearmint oil, rosemary oil, and mixtures thereof, wherein the composition has an insect knockdown rate at 30 seconds greater than or equal to about 90% and an insect mortality rate at 24 hours greater than or equal to about 98%, as measured by the U.S. EPA Product Performance Test Guidelines, OCSPP 810.3500.

In some embodiments, the pest control composition provides a pest mortality rate of at least 96%, at least 97%, at least 98%, at least 99%, or at least 100% in 24 hours for at least the American cockroach, German cockroach, Argentine ant, Pharaoh ant, and mosquito. Further, in some embodiments, the pest control composition provides a pest knockdown rate of at least 90%, at least 92%, at least 94%, at least 96%, at least 98%, at least 99%, or at least 100% in 30 seconds for at least the American cockroach, German cockroach, Argentine ant, Pharaoh ant, and mosquito.

Unless stated otherwise, the efficacy tests were conducted in accordance with the U.S. Environmental Protection Agency Product Performance Test Guidelines, OCSPP 810.3500: Premises Treatments, which provides recommendations for the design and execution of laboratory and field studies to evaluate the performance of pesticide products applied in or around premises in connection with registration of pesticide products under the Federal Insecticide, Fungicide, and Rodenticide Act (FIFRA) (7 U.S.C. 136, et seq.). The entire contents of these testing guidelines are incorporated by reference herein.

In general, the following data was recorded for each sample set: sample group size, genus species, sex, maturity and general condition. The number of insects knocked down after thirty seconds and number of insects dead after twenty-four hours post treatment were also recorded. The conditions of the testing area (temperature, humidity, date and time) were also clearly associated with each testing round of samples and control. Additionally, the knockdown and mortality results were reported in both number relative to sample size and as a percentage of the sample size.

During the tests, the formulations were tested on a variety of insects. For flying insects, the formulations were tested by holding the insects (e.g., mosquitos, *Culex quinquefasciatus*, flies, *Musca domestica*) in a container with a screened bottom and top openings to prevent pooling of the sample and based on the targets' size and ability to escape. The insects were directly sprayed with the composition while in the container. Knockdown observations were taken thirty seconds after application of the formulation. Afterwards, the insects were to be transferred to a clean container, given water and held for twenty-four-hour mortality observation, after which time the total number of dead insects was recorded. A group of untreated insects were also held in clean containers for twenty-four hours mortality observation as a control to the treated test system.

For crawling insects, the formulations were tested by treating the insects (e.g., cockroaches, *Blattella germanica, Periplaneta americana*, ants, *Linepithema humile, Monomorium pharaonis*) on a large platform with clean craft paper placed on its surface. A large "arena" ring was placed on top of the paper, with a smaller treatment ring in the center, placed on top of a sheet of vinyl flooring. Twenty seconds after treatment the smaller treatment ring was removed. Knockdown observations were taken either thirty seconds or two minutes after application of formulation to the insects. Approximately two minutes post treatment, insects were collected from the arena and placed into clean holding containers for twenty-four-hour mortality observations. A group of untreated insects were also held in clean containers for twenty-four-hour mortality observations as a control to the treated test system.

Example 1

Several formulations according to embodiments of the present disclosure were tested and efficacy data, including knockdown and mortality data, was collected for the formulations.

First, the following ingredients in Table 1 were used to prepare Formulations A-C.

Formulations A-C are water-based insecticidal formulations and include about 4.7% to about 4.8% spearmint oil; about 2.6% rosemary oil; about 24% to about 68% water; about 10.4% isopropyl myristate; about 6.5% ethyl lactate; about 6.5% butyl lactate; about 0% to about 3.0% sodium lauryl sulfate; about 0% to about 42% glyceryl monooleate; about 0% to about 0.30% sodium benzoate; about 0% to about 1.2% saponin; and about 0% to about 0.80% polyglyceryl oleate.

TABLE 1

Components of Formulations A-C

| Ingredient | Formulation A (wt. %) | Formulation B (wt. %) | Formulation C (wt. %) |
|---|---|---|---|
| Spearmint oil | 4.75% | 4.70% | 4.70% |
| Rosemary oil | 2.59% | 2.57% | 2.57% |
| Water | 67.26% | 65.33% | 24.62% |
| Isopropyl myristate | 10.40% | 10.40% | 10.40% |
| Ethyl lactate | 6.50% | 6.50% | 6.50% |
| Butyl lactate | 6.50% | 6.50% | 6.50% |
| Sodium lauryl sulfate | 0.00% | 0.22% | 2.70% |
| Glyceryl monooleate | 0.00% | 3.48% | 41.71% |
| Sodium benzoate | 0.00% | 0.30% | 0.30% |
| Saponin | 1.20% | 0.00% | 0.00% |
| Polyglyceryl-10 oleate | 0.8% | 0.00% | 0.00% |

Second, the following ingredients in Table 2 were used to prepare Formulations D-H.

Formulations D-H are water-based insecticidal formulations and comprise about 1.0% to about 4.7% spearmint oil; about 0.6% to about 7.5% rosemary oil; about 65% to about 81% water; about 0% to about 10.4% isopropyl myristate; about 6.5% ethyl lactate, about 0% to about 6.5% butyl lactate; about 0.6% or 3.7% surfactant; and about 0% to about 0.3% preservative.

TABLE 2

Components of Formulations D-H.

| Ingredient | Formulation D (wt. %) | Formulation E (wt %) | Formulation F (wt %) | Formulation G (wt %) | Formulation H (wt %) |
|---|---|---|---|---|---|
| Spearmint oil | 4.70% | 4.098% | 4.70% | 2.50% | 1.00% |
| Rosemary oil | 2.57% | 7.50% | 2.57% | 1.37% | 0.55% |
| Water | 75.73% | 77.00% | 65.33% | 77.23% | 80.93% |
| Isopropyl myristate | 0.00% | 10.40% | 10.40% | 10.40% | 10.40% |
| Ethyl lactate | 6.50% | 6.50% | 6.50% | 6.50% | 6.50% |
| Butyl lactate | 6.50% | 0.00% | 6.50% | 0.00% | 0.00% |
| Sodium Lauryl Sulfate or Sodium Oleate or Potassium Oleate or Sodium Ricinolate | 0.22% | 0.00% | 2.70% | 0.00% | 0.62% |
| Glyceryl monooleate | 3.48% | 0.00% | 1.00% | 0.00% | 0.00% |
| Polyglyceryl oleate | 0.00% | 0.80% | 0.00% | 0.80% | 0.00% |
| Saponin | 0.00% | 1.20% | 0.00% | 1.20% | 0.00% |
| Sodium benzoate | 0.30% | 0.00% | 0.30% | 0.00% | 0.00% |

Formulations B and D-H were tested according to the premises treatment procedures discussed above. The results are summarized in Table 3 below. Formulation F showed exceptional performance with 90% or greater efficacy in all species tests for both knockdown (30 seconds) and mortality (24 hours).

TABLE 3

| Efficacy data of formulations B and D-H. | | | | | | |
|---|---|---|---|---|---|---|
| Efficacy | B | D | E | F | G | H |
| American cockroach (*Periplaneta americana*) mean % knockdown 30 seconds | 0.00% | 0.00% | 20% | 90% | 0.00% | 0.00% |
| American cockroach (*Periplaneta americana*) mean % mortality 24 hours | 0.00% | 0.00% | 100% | 100% | 0.00% | 0.00% |
| German cockroach (*Blattella germanica*) mean % knockdown 30 seconds | 20% | 13% | 12% | 0.00% | 0.00% | 0.00% |
| German cockroach (*Blattella germanica*) mean % mortality 24 hours | 80% | 28% | 22% | 100% | 23% | 0.00% |
| Argentine ant (*Linepithema humile*) mean % knockdown 30 seconds | 0.00% | 0.00% | 0.00% | 100% | 0.00% | 0.00% |
| Argentine ant (*Linepithema humile*) mean % mortality 24 hours | 0.00% | 0.00% | 0.00% | 100% | 0.00% | 0.00% |
| Pharaoh ant (*Monomorium pharaonis*) mean % knockdown 30 seconds | 0.00% | 0.00% | 0.00% | 100% | 0.00% | 0.00% |
| Pharaoh ant (*Monomorium pharaonis*) mean % mortality 24 hours | 0.00% | 0.00% | 0.00% | 100% | 0.00% | 0.00% |
| Mosquito (*Culex quinquefasciatus*) mean % knockdown 30 seconds | 0.00% | 0.00% | 0.00% | 100% | 0.00% | 0.00% |
| Mosquito (*Culex quinquefasciatus*) mean % mortality 24 hours | 0.00% | 0.00% | 0.00% | 100% | 0.00% | 0.00% |

Example 2

In addition to studying the efficacy of several formulations of the present disclosure, the effect of changing the relative amounts of the at least one mint oil (e.g., spearmint oil, peppermint oil, cornmint oil) and rosemary oil was studied. In other words, the effect of altering the ratio of the at least one mint oil (e.g., spearmint oil, peppermint oil, cornmint oil) to rosemary oil was studied. Here, Formulations 1-8 were prepared according to the weight percentages shown in Tables 5 and 6. To keep other variables constant, the total amount of essential oils were kept constant at 5%, and the other ingredients included in the formulations were also kept constant at 4% sodium lauryl sulfate, 0.5% sodium benzoate, 80.5% water, and 10% isopropyl myristate.

As shown in Table 5, Formulation 1 included 100% mint oil and did not include any rosemary oil, while Formulation 2 included 100% rosemary oil and did not include a mint oil. Further, Formulations 3-8 tested ratios between the mint oil (i.e., spearmint oil, in this embodiment) and rosemary oil of 10:1 (Formulation 3), 3:1 (Formulation 4), 1.5:1 (Formulation 5), 1:1 (Formulation 6), 1:10 (Formulation 7), and 1:3 (Formulation 8).

TABLE 5

| Components of Formulations 1-4. | | | | |
|---|---|---|---|---|
| Ingredient | Formulation 1 (wt. %) | Formulation 2 (wt. %) | Formulation 3 (wt. %) | Formulation 4 (wt. %) |
| Spearmint Oil | 5.00% | 0.00% | 4.545% | 3.75% |
| Rosemary Oil | 0.00% | 5.00% | 0.455% | 1.25% |
| Isopropyl Myristate | 10.00% | 10.00% | 10.00% | 10.00% |
| Sodium Lauryl Sulfate | 4.00% | 4.00% | 4.00% | 4.00% |
| Sodium Benzoate | 0.50% | 0.50% | 0.50% | 0.50% |
| Water | 80.50% | 80.50% | 80.50% | 80.50% |

TABLE 6

| Components of Formulations 5-8. | | | | |
|---|---|---|---|---|
| Ingredient | Formulation 5 (wt. %) | Formulation 6 (wt. %) | Formulation 7 (wt. %) | Formulation 8 (wt. %) |
| Spearmint Oil | 3.00% | 2.50% | 0.45% | 1.25% |
| Rosemary Oil | 2.00% | 2.50% | 4.55% | 3.75% |
| Isopropyl Myristate | 10.00% | 10.00% | 10.00% | 10.00% |
| Sodium Lauryl Sulfate | 4.00% | 4.00% | 4.00% | 4.00% |
| Sodium Benzoate | 0.50% | 0.50% | 0.50% | 0.50% |
| Water | 80.50% | 80.50% | 80.50% | 80.50% |

The efficacy data, including the knockdown percentage (after 30 seconds) and mortality percentage (after 24 hours), was observed for one flying insect (*Culex quinquefasciatus*) and one crawling insect (*Blattella germanica*). The results from the efficacy tests are provided in Table 7 below.

As shown in the efficacy data in Table 7, each ratio of mint oil (i.e., spearmint oil, in this embodiment) to rosemary oil exhibited strong knockdown and strong mortality results. Overall, the treated test systems exhibited 24-hour mean mortality of about 100% for *Culex quinquefasciatus*, and 30-second knockdown of greater than 90%, and in particular greater than 95%, thereby exhibiting the efficacy of formulations of the present disclosure and the wide range of ratios the mint oil and the rosemary oil may be in relative to one another while still providing optimal insecticidal properties.

TABLE 7

Efficacy Data for Formulations 1-8.

| Formulation | German cockroach (Blattella germanica) mean % knockdown 30 seconds | Mosquito (Culex quinquefasciatus) mean % knockdown 30 seconds | German cockroach (Blattella germanica) mean % mortality 24 hours | Mosquito (Culex quinquefasciatus) mean % mortality 24 hours |
|---|---|---|---|---|
| 1 | 0% | 97.78% | 5% | 100% |
| 2 | 3.33% | 95.56% | 0% | 100% |
| 3 | 0% | 97.78% | 0% | 100% |
| 4 | 0% | 95.56% | 0% | 100% |
| 5 | 0% | 97.78% | 0% | 100% |
| 6 | 0% | 95.56% | 0% | 100% |
| 7 | 0% | 97.78% | 0% | 100% |
| 8 | 0% | 97.78% | 0% | 100% |

Example 3

The effect of changing the weight percentages of the at least one mint oil (e.g., spearmint oil, peppermint oil, cornmint oil) and rosemary oil was also studied. In other words, the effect of altering the weight percentages of the at least one mint oil (e.g., spearmint oil, peppermint oil, cornmint oil) to rosemary oil was studied. Here, Formulations 9-18 were prepared according to the weight percentages shown in Tables 8-10. To keep other variables constant, the ratio of the essential oils to one another was kept constant at 1:1 and the other ingredients and their weight percentages were determined based on the weight percentages of the essential oils.

As shown in Table 8, Formulation 9 included 100 wt. % essential oil, Formulation 10 included 75 wt. % essential oil, Formulation 11 included 50 wt. % essential oil, and Formulation 12 included 25 wt. % essential oil.

TABLE 8

Components of Formulations 9-12.

| Ingredient | Formulation 9 (wt. %) | Formulation 10 (wt. %) | Formulation 11 (wt. %) | Formulation 12 (wt. %) |
|---|---|---|---|---|
| Spearmint Oil | 50.00% | 37.50% | 25.00% | 12.50% |
| Rosemary Oil | 50.00% | 37.50% | 25.00% | 12.50% |
| Glyceryl monooleate | 0.00% | 0.5823% | 1.1646% | 1.7469% |
| Potassium Oleate | 0.00% | 0.418% | 0.835% | 1.253% |
| Water | 0.00% | 14.50% | 29.00% | 43.50% |
| Isopropyl Myristate | 0.00% | 9.50% | 19.00% | 28.50% |

As shown in Table 9, Formulation 13 included 10 wt. % essential oil, Formulation 14 included 0.15 wt. % essential oil, Formulation 15 included 0.10 wt. % essential oil, and Formulation 16 included 0.01 wt. % essential oil.

TABLE 9

Components of Formulations 13-16.

| Ingredient | Formulation 13 (wt. %) | Formulation 14 (wt. %) | Formulation 15 (wt. %) | Formulation 16 (wt. %) |
|---|---|---|---|---|
| Spearmint Oil | 5.00% | 0.075% | 0.05% | 0.025% |
| Rosemary Oil | 5.00% | 0.075% | 0.05% | 0.025% |
| Glyceryl monooleate | 2.10% | 2.33% | 2.33% | 2.33% |
| Potassium Oleate | 1.504% | 1.668% | 1.669% | 1.670% |
| Water | 52.20% | 57.91% | 57.94% | 57.97% |
| Isopropyl Myristate | 34.20% | 37.94% | 37.96% | 37.98% |

As shown in Table 10, Formulation 17 included 0.01 wt. % essential oil and Formulation 18 included 0 wt. % essential oil.

TABLE 10

Components of Formulations 17 and 18.

| Ingredient | Formulation 17 (wt. %) |
|---|---|
| Spearmint Oil | 0.005% |
| Rosemary Oil | 0.005% |
| Glyceryl monooleate | 2.33% |
| Potassium Oleate | 1.671% |
| Water | 57.99% |
| Isopropyl Myristate | 38.00% |

The efficacy data, including the knockdown percentage (after 30 seconds) and mortality percentage (after 24 hours), was observed for one flying insect (*Culex quinquefasciatus*) and one crawling insect (*Blattella germanica*). The results from the efficacy tests are provided in Table 11 below.

As shown in the efficacy data in Table 11, each total amount of mint oil and rosemary oil exhibited strong knockdown and strong mortality results for *Culex quinquefasciatus*. Overall, the treated test systems exhibited 24-hour mean mortality of about 100%, and 30-second knockdown of greater than 80%, and in particular greater than 91%, thereby exhibiting the efficacy of formulations of the present disclosure and the wide range of total amounts of the mint oil and the rosemary oil may be while still providing optimal insecticidal properties.

TABLE 11

Efficacy Data for Formulations 9-17.

| Formulation | German cockroach (Blattella germanica) mean % knockdown 30 seconds | Mosquito (Culex quinquefasciatus) mean % knockdown 30 seconds | German cockroach (Blattella germanica) mean % mortality 24 hours | Mosquito (Culex quinquefasciatus) mean % mortality 24 hours |
|---|---|---|---|---|
| 9 | 80% | 100% | 100% | 100% |
| 10 | 20% | 100% | 23.33% | 100% |
| 11 | 0% | 97.78% | 0% | 100% |
| 12 | 0% | 95.56% | 0% | 100% |
| 13 | 0% | 91.11% | 0% | 100% |
| 14 | 0% | 91.11% | 0% | 100% |
| 15 | 0% | 86.67% | 0% | 100% |
| 16 | 0% | 80% | 0% | 100% |
| 17 | 0% | 86.67% | 0% | 100% |

Example 4

The effect of changing the type of essential oil used in the formulations or compositions was also studied. Here, Formulations 19-22 were prepared according to the weight percentages shown in Table 12 using clove oil (Formulation 19), elemi oil (Formulation 20), castor oil (Formulation 21), and geraniol (Formulation 22). To keep other variables constant, only one essential oil was used per formulation and the other ingredients remained constant, where the formulations included 4.00 wt. % sodium lauryl sulfate, 0.50 wt. % sodium benzoate, 80.50 wt. % water, and 10.00 wt. % isopropyl myristate.

TABLE 12

Components of Formulations 19-22.

| Ingredient | Formulation 19 (wt. %) | Formulation 20 (wt. %) | Formulation 21 (wt. %) | Formulation 22 (wt. %) |
|---|---|---|---|---|
| Clove Oil | 5.00% | 0.00% | 0.00% | 0.00% |
| Elemi Oil | 0.00% | 5.00% | 0.00% | 0.00% |
| Castor Oil | 0.00% | 0.00% | 5.00% | 0.00% |
| Geraniol Oil | 0.00% | 0.00% | 0.00% | 5.00% |
| Sodium Lauryl Sulfate | 4.00% | 4.00% | 4.00% | 4.00% |
| Sodium Benzoate | 0.50% | 0.50% | 0.50% | 0.50% |
| Water | 80.50% | 80.50% | 80.50% | 80.50% |
| Isopropyl Myristate | 10.00% | 10.00% | 10.00% | 10.00% |

The efficacy data, including the knockdown percentage (after 30 seconds) and mortality percentage (after 24 hours), was observed for one flying insect (*Culex quinquefasciatus*) and one crawling insect (*Blattella germanica*). The results from the efficacy tests are provided in Table 13 below.

As shown in the efficacy data in Table 13, formulations including other oils exhibited inferior 30-second and 24-hour mean mortality data for *Blattella germanica* compared to formulations prepared according to an embodiment of the present disclosure. As such, this example helps showcase the efficacy of formulations of the present disclosure compared to formulations having other oils and other formulations without an active component having the synergistic effect of the combination of at least one mint oil, rosemary oil, and other components.

TABLE 13

Efficacy Data for Formulations 19-22.

| Formulation | German cockroach (Blattella germanica) mean % knockdown 30 seconds | Mosquito (Culex quinquefasciatus) mean % knockdown 30 seconds | German cockroach (Blattella germanica) mean % mortality 24 hours | Mosquito (Culex quinquefasciatus) mean % mortality 24 hours |
|---|---|---|---|---|
| 19 | 0% | 100% | 0% | 100% |
| 20 | 0% | 100% | 0% | 100% |
| 21 | 40% | 100% | 40% | 100% |
| 22 | 16.67% | 100% | 43.33% | 100% |

Example 5

The effect of changing the weight percentages and the type of solvent (e.g., isopropyl alcohol, butyl lactate, propylene carbonate, etc.) was also studied. For this study and example, Formulations 31-33 were prepared according to the weight percentages shown in Table 14. To keep other variables constant, the weight percentage and ratio of the essential oils was kept constant, i.e., 2.50 wt. % spearmint oil and 2.50 wt. % rosemary oil.

As shown in Table 14, Formulation 31 included 1.00 wt. % butyl lactate, Formulation 32 included 44.00 wt. % butyl lactate, and Formulation 33 included 55.00 wt. % butyl lactate.

TABLE 14

Components of Formulations 31-33.

| Ingredient | Formulation 31 (wt. %) | Formulation 32 (wt. %) | Formulation 33 (wt. %) |
|---|---|---|---|
| Spearmint Oil | 2.50% | 2.50% | 2.50% |
| Rosemary Oil | 2.50% | 2.50% | 2.50% |
| Water | 94.00% | 51.00% | 40.00% |
| Butyl Lactate | 1.00% | 44.00% | 55.00% |

The efficacy data, including the knockdown percentage (after 30 seconds) and mortality percentage (after 24 hours), was observed for one flying insect (*Culex quinquefasciatus*) and one crawling insect (*Blattella germanica*). The results from the efficacy tests are provided in Table 15 below.

As shown in the efficacy data in Table 15, overall higher concentrations of solvent typically coincided with higher efficacy values. However, many formulations of the present disclosure include solvent in lower concentrations, such as concentrations between 3 wt. % and 10 wt. %, for example. As a result, the test results exhibit that the improved efficacy in knockdown and mortality of the formulations of the present disclosure is not simply attributable to solvents of the formulations (e.g., isopropanol or butyl lactate), but rather attributable to the synergy of the combination of essential oils and other active components present in formulations of the present disclosure.

TABLE 15

Efficacy Data for Formulations 31-33.

| Formulation | German cockroach (Blattella germanica) mean % knockdown 30 seconds | Mosquito (Culex quinquefasciatus) mean % knockdown 30 seconds | German cockroach (Blattella germanica) mean % mortality 24 hours | Mosquito (Culex quinquefasciatus) mean % mortality 24 hours |
|---|---|---|---|---|
| 31 | 0% | 48.89% | 0% | 55.56% |
| 32 | 0% | 53.33% | 0% | 64.44% |
| 33 | 0% | 66.67% | 0% | 95.56% |

Example 6

The effect of changing the weight percentages and the type of surfactant (e.g., potassium oleate, glycerol monooleate) was also studied. For this study and example, Formulations 34-38 were prepared according to the weight percentages shown in Tables 18 and 19. To keep other variables constant, the weight percentage and ratio of the essential oils was kept constant, i.e., 2.50 wt. % spearmint oil and 2.50 wt. % rosemary oil.

As shown in Table 16, Formulation 34 included 0.01 wt. % potassium oleate, Formulation 35 included 0.10 wt. % potassium oleate, Formulation 36 included 2.00 wt. % potassium oleate, and Formulation 37 included 4.00 wt. % potassium oleate.

TABLE 16

Components of Formulations 34-37.

| Ingredient | Formulation 34 (wt. %) | Formulation 35 (wt. %) | Formulation 36 (wt. %) | Formulation 37 (wt. %) |
|---|---|---|---|---|
| Spearmint Oil | 2.50% | 2.50% | 2.50% | 2.50% |
| Rosemary Oil | 2.50% | 2.50% | 2.50% | 2.50% |
| Water | 94.99% | 94.90% | 93.00% | 91.00% |
| Potassium Oleate | 0.01% | 0.10% | 2.00% | 4.00% |

As shown in Table 17, Formulation 38 included 10.00 wt. % potassium oleate.

TABLE 17

Components of Formulation 38.

| Ingredient | Formulation 38 (wt. %) |
|---|---|
| Spearmint Oil | 2.50% |
| Rosemary Oil | 2.50% |
| Water | 85.00% |
| Potassium Oleate | 10.00% |

The efficacy data, including the knockdown percentage (after 30 seconds) and mortality percentage (after 24 hours), was observed for one flying insect (*Culex quinquefasciatus*) and one crawling insect (*Blattella germanica*). The results from the efficacy tests are provided in Table 18 below.

As shown in the efficacy data in Table 18, overall higher concentrations of surfactant typically coincided with higher efficacy values. However, many formulations of the present disclosure include surfactants in lower concentrations, such as concentrations between 0.1% to about 4% by weight, for example. As a result, the test results exhibit that the improved efficacy in knockdown and mortality of the formulations of the present disclosure is not simply attributable to surfactants of the formulations, but rather attributable to the synergy of the combination of essential oils and other active components present in formulations of the present disclosure.

TABLE 18

Efficacy Data for Formulations 34-38.

| Formulation | German cockroach (Blattella germanica) mean % knockdown 30 seconds | Mosquito (Culex quinquefasciatus) mean % knockdown 30 seconds | German cockroach (Blattella germanica) mean % mortality 24 hours | Mosquito (Culex quinquefasciatus) mean % mortality 24 hours |
|---|---|---|---|---|
| 34 | 0.00% | 37.78% | 0.00% | 51.11% |
| 35 | 0.00% | 48.89% | 0.00% | 60% |
| 36 | 0.00% | 48.89% | 0.00% | 60% |
| 37 | 23.33% | 60% | 43.33% | 97.78% |
| 38 | 16.67% | 80% | 63.33% | 97.78% |

Example 7

The effect of changing the weight percentage of the preservative was also studied. For this study and example, Formulations 39-43 were prepared according to the weight percentages shown in Tables 19 and 20. To keep other variables constant, the weight percentage and ratio of the essential oils was kept constant, i.e., 2.50 wt. % spearmint oil and 2.50 wt. % rosemary oil.

As shown in Table 19, Formulation 39 included 0.05 wt. % sodium benzoate, Formulation 40 included 0.10 wt. % sodium benzoate, Formulation 41 included 0.25 wt. % sodium benzoate, and Formulation 42 included 0.5 wt. % sodium benzoate.

TABLE 19

Components of Formulations 39-42.

| Ingredient | Formulation 39 (wt. %) | Formulation 40 (wt. %) | Formulation 41 (wt. %) | Formulation 42 (wt. %) |
|---|---|---|---|---|
| Spearmint Oil | 2.50% | 2.50% | 2.50% | 2.50% |
| Rosemary Oil | 2.50% | 2.50% | 2.50% | 2.50% |
| Sodium Benzoate | 0.05% | 0.10% | 0.25% | 0.5% |
| Water | 94.95% | 94.90% | 94.75% | 94.50% |

As shown in Table 20, Formulation 43 included 5.00 wt. % sodium benzoate.

TABLE 20

Components of Formulation 43.

| Ingredient | Formulation 43 (wt. %) |
|---|---|
| Spearmint Oil | 2.50% |
| Rosemary Oil | 2.50% |
| Sodium Benzoate | 5.00% |
| Water | 90.00% |

The efficacy data, including the knockdown percentage (after 30 seconds) and mortality percentage (after 24 hours), was observed for one flying insect (*Culex quinquefasciatus*) and one crawling insect (*Blattella germanica*). The results from the efficacy tests are provided in Table 21 below.

As shown in the efficacy data in Table 21, overall higher concentrations of preservative typically coincided with higher efficacy values towards *Culex quinquefasciatus*. However, many formulations of the present disclosure include the preservative in low concentrations, such as concentrations between 0.10% and 0.55% by weight, for example. As a result, the test results exhibit that the improved efficacy in knockdown and mortality of the formulations of the present disclosure is not simply attributable to the preservative of the formulations, but rather attributable to the synergy of the combination of essential oils and other active components present in formulations of the present disclosure.

TABLE 21

Efficacy Data for Formulations 39-43.

| Formulation | German cockroach (Blattella germanica) mean % knockdown 30 seconds | Mosquito (Culex quinquefasciatus) mean % knockdown 30 seconds | German cockroach (Blattella germanica) mean % mortality 24 hours | Mosquito (Culex quinquefasciatus) mean % mortality 24 hours |
|---|---|---|---|---|
| 39 | 0% | 33.33% | 0% | 35.56% |
| 40 | 0% | 35.56% | 0% | 37.78% |
| 41 | 0% | 40.00% | 0% | 46.67% |
| 42 | 23.33% | 44.44% | 30% | 48.89% |
| 43 | 0% | 37.78% | 0% | 71.11% |

Example 8

The effect of changing the weight percentage and type of the propellant was also studied. For this study and example, Formulations 44-46 were prepared according to the weight percentages shown in Table 22. To keep other variable constant, the weight percentage and ratio of the essential oils was kept constant, i.e., 2.50 wt. % spearmint oil and 2.50 wt. % rosemary oil.

As shown in Table 22, Formulation 44 included 0.50 wt. % nitrogen, Formulation 45 included 0.80 wt. % nitrogen, and Formulation 46 included 1.00 wt. % nitrogen.

TABLE 22

Components of Formulations 44-46.

| Ingredient | Formulation 44 (wt. %) | Formulation 45 (wt. %) | Formulation 46 (wt. %) |
|---|---|---|---|
| Spearmint Oil | 2.50% | 2.50% | 2.50% |
| Rosemary Oil | 2.50% | 2.50% | 2.50% |
| Water | 94.95% | 94.92% | 94.00% |
| Nitrogen | 0.50% | 0.80% | 1.00% |

The efficacy data, including the knockdown percentage (after 30 seconds) and mortality percentage (after 24 hours), was observed for one flying insect (*Culex quinquefasciatus*) and one crawling insect (*Blattella germanica*). The results from the efficacy tests are provided in Table 23 below.

As shown in the efficacy data in Table 23, the testing results showcase optimal propellant amounts that may be used in combination with the formulations of the present disclosure, if an aerosol formulation is desired. Although this testing was only performed for nitrogen, it should be understood that other propellants, including but not limited to, carbon dioxide or hydrocarbons, for example, may also be used in combination with the formulations of the present disclosure.

TABLE 23

Efficacy Data for Formulations 44-46.

| Formu-lation | German cockroach (Blattella germanica) mean % knockdown 30 seconds | Mosquito (Culex quinque-fasciatus) mean % knockdown 30 seconds | German cockroach (Blattella germanica) mean % mortality 24 hours | Mosquito (Culex quinque-fasciatus) mean % mortality 24 hours |
|---|---|---|---|---|
| 44 | 0.00% | ND | 0.00% | ND |
| 45 | 16.67% | ND | 23.33% | ND |
| 46 | 20% | 68.89% | 30% | 93.33% |

Example 9

The effect of the type of carrier used for the formulations was also tested to determine if aspects of the present disclosure can be used with formulations having alternative base carriers. For this example, Formulations 47 and 48 were prepared according to the ingredients and weight percentages listed in Table 24. Formulations 47 and 48 are oil-based insecticidal formulations, rather than water-based insecticidal formulations and comprise about 1.5 wt. % mint oil, about 0.82 wt. % rosemary oil, about 76 wt. % to about 80 wt. % carrier, about 11.1 wt. % isopropyl myristate, about 6.9 wt. % solvent, and about 2.9 wt. % of an optional propellant.

TABLE 24

Components of Formulations 47 and 48.

| Ingredient | Formulation 47 (wt. %) | Formulation 48 (wt. %) |
|---|---|---|
| Spearmint or peppermint or cornmint oil | 1.50% | 1.50% |
| Rosemary oil | 0.82% | 0.82% |
| White mineral oil | 76.82% | 79.67% |
| Isopropyl myristate | 11.08% | 11.08% |
| Ethyl lactate or butyl lactate or isopropyl alcohol | 6.93% | 6.93% |
| Carbon dioxide ($CO_2$) | 2.85% | 0.00% |

Formulations 47 and 48 were tested according to the premises treatment procedures discussed above and the results are summarized in Table 25 below. Overall, the treated test systems exhibited 24-hour mean mortality of greater than 80%, while all untreated test systems exhibited 24-hour mean mortality of less than 10%, thereby exhibiting the efficacy of formulations of the present disclosure. In addition, this efficacy data exhibits the other carriers that may be used in the compositions of the present disclosure, as well as the ability of water-based compositions to yield comparable efficacy results to oil-based compositions.

TABLE 25

Efficacy data for formulations 47 and 48.

| Efficacy | Formulation 47 | Formulation 48 |
|---|---|---|
| American cockroach (*Periplaneta americana*) mean % knockdown 30 seconds | 26% | 54% |
| American cockroach (*Periplaneta americana*) mean % mortality 24 hours | 96% | 100% |
| German cockroach (*Blattella germanica*) mean % knockdown 30 seconds | 98% | 100% |
| German cockroach (*Blattella germanica*) mean % mortality 24 hours | 100% | 100% |
| Argentine ant (*Linepithema humile*) mean % knockdown 30 seconds | 100% | 100% |
| Argentine ant (*Linepithema humile*) mean % mortality 24 hours | 100% | 100% |
| Pharaoh ant (*Monomorium pharaonis*) mean % knockdown 30 seconds | 100% | 100% |
| Pharaoh ant (*Monomorium pharaonis*) mean % mortality 24 hours | 100% | 100% |
| Mosquito (*Culex quinquefasciatus*) mean % knockdown 30 seconds | 100% | 100% |
| Mosquito (*Culex quinquefasciatus*) mean % mortality 24 hours | 100% | 100% |

Example 10

Other formulations according to other embodiments of the present disclosure were also tested and efficacy data, including repellency data, was collected. In particular, repellent efficacy data was collected for a formulation having an active component with at least one mint oil and a rosemary oil. In this example, the ratio between the at least one mint oil (e.g., spearmint oil) and rosemary oil was kept constant, but the specific weight percentages of the at least one mint oil and rosemary oil was increased to produce a formulation that could be emitted from a device. Further, the number of other active ingredients (e.g., sodium lauryl sulfate) and other inert ingredients (e.g., water, glyceryl monooleate, saponin, sodium benzoate) was decreased, such that the formulation tested included an active component having only one mint oil (i.e., spearmint oil) and rosemary, and the inert component included only a solvent (i.e., ethyl lactate, butyl lactate, or isopropyl alcohol, or propylene carbonate). Further, in this example, embodiments of the present disclosure were tested using a dispenser mechanism, such as one of the insect repellency devices disclosed in U.S. application Ser. Nos. 17/837,110 and 17/878,629, the entire contents of which are incorporated herein by reference.

More particularly, the ingredients in Table 26 were used to prepare Formulation 49. Formulation 49 is an insect repellent composition comprising about 32.5% spearmint oil; about 17.5% rosemary oil; and about 50% ethyl lactate or butyl lactate or isopropyl alcohol or propylene carbonate.

TABLE 26

Components of Formulation 49.

| Ingredient | Formulation 49 (wt. %) |
|---|---|
| Spearmint oil | 32.50 |
| Rosemary oil | 17.50 |
| Ethyl Lactate or Butyl Lactate or Isopropyl Alcohol or Propylene Carbonate | 50.00 |

Test plots were constructed including two walls and a flat and level table was placed about 5 ft. from the vertex of the walls. Next, traps were placed around the perimeter of a 6 ft. diameter circle, centralized around the table. More so, two other traps were placed 120 degrees away from the initial trap around the perimeter of the circle.

A pre-count period was run for 30 minutes, after which collection bags were removed and replaced with new, collection bags for four intervals. After collection, mosquitos in the collection bags were taken to be counted.

Percent repellency versus the untreated control was calculated for each data point (each 30-minute collection over the 2-hour test period). The percent repellency was calculated by adding the number of mosquitos in the three traps at each test plot per time point and comparing that number to the total number of mosquitoes in the three traps of the untreated control plot per time point.

Repellency results were collected for this formulation and the percent repellency is shown Table 27 below. The median of the repellency results and a 95% confidence level around the sample median was also calculated.

As shown in Table 27, embodiments of the present disclosure also provided desired repellency effects. While timepoints at the beginning of the evaluation period showed lower repellency during protection buildup, the overall median percent repellency showed a significant reduction of captured mosquitoes in the treatment zone compared to an untreated area, thereby supporting the premise that the test substance is also effective at repelling mosquitoes.

TABLE 27

Repellency results for Formulation 49.

| Measure | Value | |
|---|---|---|
| Data values | 1.5% | 99.60% |
| | 46.50% | 99.70% |
| | 46.50% | 99.90% |
| | 51.70% | 99.90% |
| | 87.80% | 99.90% |
| | 98.60% | 100.00% |
| | 98.80% | 100.00% |
| | 99.10% | 100.00% |
| Median percent repellency | 99.30% | |
| 95% LCL of the median | 87.80% | |

Another repellency test was performed using Formulation 49 in a device disclosed in U.S. application Ser. No. 17/878,629, filed on Aug. 1, 2022, and titled "Volatile Material Dispenser," the entire contents of which is incorporated herein by reference. Here, several test sites were constructed having several radii of collection. Further, the dispensing devices operated on variable duty cycles (i.e., seconds dispensing/seconds not dispensing). Even further, the timing of the tests included a 30-minute control at each site, an activation of the device, and then collection of the mosquitoes every 30 minutes thereafter for 2 hours. The specific testing procedures for each site are discussed below and the results of these repellency tests are provided in Tables 28-31 below. In some of the tests, device issues or failures occurred (i.e., day 1 and 4 of test site #1 and day 1 of test site #2). Therefore, average repellency percentages were calculated with and without some of the days of device failure.

Test #1 had a 6 ft. diameter and a 12/12 duty cycle (i.e., 12 seconds of dispending and 12 seconds not dispensing).

TABLE 28

Repellency Results of Formulation 49 at Test Site #1

| Collection Time | Day 1 | Day 2 | Day 3 | Day 4 | Average (including Day 1) |
|---|---|---|---|---|---|
| 0.5 hour | 72.0% | 65.8% | 54.4% | 84.0% | 85.1% |
| 1.0 hour | 86.1% | 90.2% | 84.1% | 98.5% | |
| 1.5 hour | 80.8% | 99.8% | 91.7% | 99.6% | |
| 2.0 hour | 79.2% | 98.3% | 78.3% | 97.0% | |

Test Site #2 had an 8 ft. diameter and a 12/12 duty cycle.

TABLE 29

Repellency Results of Formulation 49 at Test Site #2

| Collection Time | Day 1 | Day 2 | Day 3 | Day 4 | Average (including Day 1) |
|---|---|---|---|---|---|
| 0.5 hour | | | 59.6% | 93.4% | 98.40% |
| 1.0 hour | 76.5% | 99.1% | 97.0% | 99.4% | |
| 1.5 hour | 100.0% | 100.0% | 100.0% | 99.8% | |
| 2.0 hour | 64.8% | 100.0% | 97.8% | 98.9% | |

Test Site #3 had a 10 ft. diameter and a 12/12 duty cycle.

TABLE 30

Repellency Results of Formulation 49 at Test Site #3

| Collection Time | Day 1 | Day 2 | Day 3 | Day 4 | Average (including Day 1) |
|---|---|---|---|---|---|
| 0.5 hour | 6.3% | 79.4% | — | 92.2% | 98.60% |
| 1.0 hour | 100.0% | 100.0% | 97.3% | 97.5% | |
| 1.5 hour | 89.2% | 99.8% | 100.0% | 99.8% | |
| 2.0 hour | 64.8% | 99.6% | 100.0% | 100.0% | |

Test Site #4 had a 6 ft. diameter and a 6/18 duty cycle.

TABLE 31

Repellency Results of Formulation 49 at Test Site #4

| Collection Time | Day 1 | Day 2 | Day 3 | Day 4 | Average (including Day 1) |
|---|---|---|---|---|---|
| 0.5 hour | 51.7% | 1.5% | 87.8% | 98.8% | 99.30% |
| 1.0 hour | 46.5% | 99.6% | 99.9% | 99.9% | |
| 1.5 hour | 100.0% | 99.7% | 100.0% | 100.0% | |
| 2.0 hour | 46.5% | 99.1% | 98.6% | 99.9% | |

As shown in Tables 30-33, the embodiments of the present disclosure also provide desired repellency effects when used with dispensing devices. While timepoints and device failures occurred at some instances, the overall percent repellency showed a significant reduction of captured mosquitoes in the treatment zone compared to an untreated area, thereby supporting that the test substance is highly effective at repelling mosquitoes.

The various methods and techniques described above provide a number of ways to carry out embodiments of the present disclosure. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art. Among these variations, without limitation, are the at least two active ingredients selected for the pest control composition, the target pest, and the amounts of the various ingredients present in the pest control composition. Various embodiments of the invention can specifically include or exclude any of these variations or elements.

In some embodiments, the numbers expressing quantities of ingredients, properties such as weight percentages, percent repellency, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

In some embodiments, the terms "a" and "an" and "the" and similar references used in the context of describing a particular embodiment of the present disclosure (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Particular embodiments of the present disclosure are described herein, including the best mode known to the inventors for carrying out the invention. Variations on those preferred embodiments will become apparent to those of ordinary skill in the art upon reading the foregoing description. It is contemplated that skilled artisans can employ such variations as appropriate, and the invention can be practiced otherwise than specifically described herein. Accordingly, many embodiments of this invention include all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the above cited references and printed publications are herein individually incorporated by reference in their entirety.

In closing, it is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the disclosure and to teach the best mode of carrying out same. The exclusive rights to all modifications which come within the scope of the appended claims are reserved.

We claim:

1. A pest control composition, the composition comprising:

an active component consisting essentially of:

a) between about 0.1 wt. % and about 15 wt. % spearmint oil;

b) between about 0.05 wt. % and about 5 wt. % rosemary oil; and between about 45 wt. % and about 75 wt. % of water;

a solvent; and between about 0.1 wt. % and about 4 wt. % of a surfactant comprising (i) a first surfactant selected from the group consisting of sodium lauryl sulfate, sodium oleate, potassium oleate, and sodium ricinolate; and (ii) a second surfactant that is glyceryl monooleate, wherein the composition comprises between about 1.25 wt. % and about 3.7 wt. % of the first surfactant;

wherein a weight ratio of spearmint oil to rosemary oil is from about 1.5:1 to about 3:1, wherein all weight percentages are percent by weight of the total composition.

2. The composition of claim 1, wherein the active component is between about 6 wt. % and about 9 wt. %.

3. The composition of claim 1, wherein the spearmint oil is between about 1.5 wt. % and about 7.5 wt. %, and the rosemary oil is between about 0.8 wt. % and about 4.2 wt. %.

4. The composition of claim 1, wherein the weight ratio of the spearmint oil to rosemary oil is from about 1.5:1 to about 2.2:1.

5. The composition of claim 1, wherein the solvent is selected from the group consisting of ethyl lactate, butyl lactate, isopropyl alcohol, isopropyl myristate, and combinations thereof.

6. The composition of claim 1, wherein the surfactant further comprises a surfactant selected from the group consisting of lecithin, Quillaja saponin, polyglyceryl oleate, and any combinations thereof.

7. The composition of claim 1, wherein the composition comprises between about 0.1 wt. % and about 0.5 wt. % by weight of a preservative; between about 1 wt. % and about 5 wt. % of a propellant; and between about 1 wt. % and about 44 wt. % of the solvent.

8. The composition of claim 7, wherein the propellant is selected from the group consisting of compressed gas propellants, liquified gas propellants, saturated hydrocarbons, mixtures of liquified gas and compressed gas, methane, ethane, propane, pentane, isobutene, n-butane, isobutane, dimethyl ether, 1, 1-difluoroethane, 1,1,1,2-tetrafluoroethane, carbon dioxide, nitrogen, air, and any combinations thereof.

9. The pest control composition of claim 1, wherein the active component is a blend of essential oils and consists of spearmint oil and rosemary oil.

10. The pest control composition of claim 1, wherein the active component is a blend of essential oils and a total weight percent of the blend of essential oils is between about 5 wt. % and about 20 wt. %.

11. A pest control composition, the composition comprising:

an active component consisting essentially of:

a) between about 0.05 wt. % and about 5 wt. % rosemary oil;

b) between about 0.1 wt. % and about 15 wt. % of a mint oil;

between about 45 wt. % and about 75 wt. % of water;

a solvent; and between about 0.1 wt. % and about 4 wt. % of a surfactant comprising (i) a first surfactant selected from the group consisting of sodium lauryl sulfate, sodium oleate, potassium oleate, and sodium ricinolate; and (ii) a second surfactant that is glyceryl monooleate, wherein the composition comprises between about 1.25 wt. % and about 3.7 wt. % of the first surfactant;

wherein the active component is a blend of essential oils and a total amount of essential oils is between about 5 wt. % and about 15 wt. %, wherein a weight ratio of the mint oil to rosemary oil is from about 1.5:1 to about 3:1, wherein all weight percentages are percent by weight of the total composition.

12. The composition of claim 11, wherein the mint oil is selected from the group consisting of spearmint oil, peppermint oil, cornmint oil, and combinations thereof.

13. The composition of claim 12, wherein the composition comprises between about 0.1 wt. % and about 0.5 wt. % by weight of a preservative; between about 1 wt. % and about 5 wt. % of a propellant; and between about 1 wt. % and about 44 wt. % of the solvent.

14. The composition of claim 13, wherein the solvent is selected from the group consisting of ethyl lactate, butyl lactate, isopropyl alcohol, isopropyl myristate, and combinations thereof.

15. The composition of claim 14, wherein the surfactant further includes a surfactant selected from the group consisting of lecithin, Quillaja saponin, polyglyceryl oleate, and any combinations thereof.

16. The composition of claim 15, wherein the mint oil is spearmint oil.

17. The composition of claim 11, wherein the composition includes a propellant, and the propellant is selected from the group consisting of compressed gas propellants, liquified gas propellants, saturated hydrocarbons, mixtures of liquified gas and compressed gas, methane, ethane, propane, pentane, isobutene, n-butane, isobutane, dimethyl ether, 1,1-difluoroethane, 1,1,1,2-tetrafluoroethane, carbon dioxide, nitrogen, air, and any combinations thereof.

18. The pest control composition of claim 11, wherein the pest control composition includes between about 1.25 wt. % and about 3.7 wt. % of sodium lauryl sulfate.

19. A pest control composition, the composition comprising:

an active component consisting of:

a) between about 1.5 wt. % and about 7.5 wt. % of a mint oil selected from the group consisting of spearmint oil, peppermint oil, cornmint oil, and combinations thereof;

b) between about 0.05 wt. % and about 5 wt. % rosemary oil; and between about 1.25 wt. % and about 3.7 wt. % sodium lauryl sulfate, sodium oleate, potassium oleate, or sodium ricinolate;

between about 45 wt. % and 75 wt. % water;

between about 3 wt. % and about 25 wt. % of at least one solvent;

between about 0.1 wt. % and about 4 wt. % of at least one surfactant comprising glyceryl monooleate; and between about 0.1 wt. % and about 0.5 wt. % of at least one preservative, wherein the weight ratio of the mint oil to rosemary oil is from about 1.5:1 to about 3:1;

wherein all weight percentages are percent by weight of the total composition.

20. A pest control composition, the composition consisting of:

an active component consisting of:

a) between about 0.05 wt. % and about 5 wt. % rosemary oil;

b) between about 0.1 wt. % and about 15 wt. % of a mint oil;

between about 45 wt. % and about 75 wt. % of water;

a solvent selected from the group consisting of ethyl lactate, butyl lactate, isopropyl alcohol, isopropyl myristate, and combinations thereof; and between about 0.1 wt. % and about 4 wt. % of a surfactant comprising (i) a first surfactant selected from the group consisting of sodium lauryl sulfate, sodium oleate, potassium oleate, and sodium ricinolate; and (ii) a second surfactant that is glyceryl monooleate, wherein the composition comprises between about 1.25 wt. % and about 3.7 wt. % of the first surfactant;

wherein the active component is a blend of essential oils and a total amount of essential oils is between about 5 wt. % and about 15 wt. %, wherein a weight ratio of the mint oil to rosemary oil is from about 1.5:1 to about 3:1, wherein all weight percentages are percent by weight of the total composition.

* * * * *